United States Patent [19]
Moro

[11] Patent Number: 6,047,092
[45] Date of Patent: Apr. 4, 2000

[54] IMAGE PROCESSING SYSTEM TO CORRECT THE DENSITY RANGE OF IMAGE DATA AND PERFORM FILTERING PROCESSING ON IMAGE DATA

[75] Inventor: Akihiro Moro, Kawasaki, Japan

[73] Assignee: Kabushiki Kaisha Toshiba, Kawasaki, Japan

[21] Appl. No.: 08/934,666

[22] Filed: Sep. 22, 1997

[30] Foreign Application Priority Data

Sep. 30, 1996 [JP] Japan ................................ 8-278890

[51] Int. Cl.⁷ ............................................... G06K 9/38
[52] U.S. Cl. ......................... 382/261; 358/448; 382/169
[58] Field of Search ................................ 382/260–265, 382/169; 358/448.455; 395/109

[56] References Cited

U.S. PATENT DOCUMENTS

| | | | |
|---|---|---|---|
| 4,695,884 | 9/1987 | Anastassiou et al. | 382/169 |
| 5,012,333 | 4/1991 | Lee et al. | 358/520 |
| 5,400,377 | 3/1995 | Hu et al. | 378/8 |
| 5,513,282 | 4/1996 | Williams | 358/448 |
| 5,682,033 | 10/1997 | Cattorini | 358/483 |
| 5,684,601 | 11/1997 | Endo | 358/298 |
| 5,724,444 | 3/1998 | Yamanishi | 382/271 |

FOREIGN PATENT DOCUMENTS 377 386  7/1990  European Pat. Off. .

OTHER PUBLICATIONS

Nakamura et al., "High Quality Image Processing Method using Moire Suppression and Edge Enhancement Filtering," The Journal of Institute of Image Electronics Engineer of Japan, vol. 22, No. 5, 1993, pp. 445–450.

*Primary Examiner*—Thomas D. Lee
*Assistant Examiner*—Stephen Brinich
*Attorney, Agent, or Firm*—Foley & Lardner

[57] ABSTRACT

An image processing apparatus for processing original image data, having a given density range, with a predetermined manner to provide processed image data, comprising means for correcting the density range of the image data to provide density-range-corrected image data corresponding to a distribution of the density of the image data, means for filtering the image data to generate filtered image data, means for synthesizing the density-range-corrected image data provided by the correcting means and the filtered image data provided by the filtering means so as to provide synthesized image data, and means for selecting either one of the density-range-corrected image data provided by the correcting means and the synthesized image data provided by the synthesizing means, in accordance with the density range of the density-range-corrected image data, so as to provide selected image data as the processed image data.

22 Claims, 14 Drawing Sheets

| DIVISION NUMBER | RANGE OF IMAGE DATA VALUE |
|---|---|
| 0 | 00 ~ 0F |
| 1 | 10 ~ 1F |
| 2 | 20 ~ 2F |
| 3 | 30 ~ 3F |
| 4 | 40 ~ 4F |
| 5 | 50 ~ 5F |
| 6 | 60 ~ 6F |
| 7 | 70 ~ 7F |
| 8 | 80 ~ 8F |
| 9 | 90 ~ 9F |
| A | A0 ~ AF |
| B | B0 ~ BF |
| C | C0 ~ CF |
| D | D0 ~ DF |
| E | E0 ~ EF |
| F | F0 ~ FF |

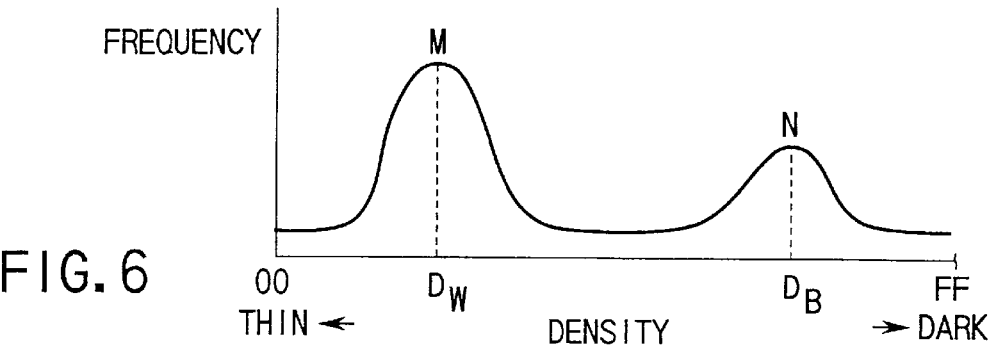
FIG. 6
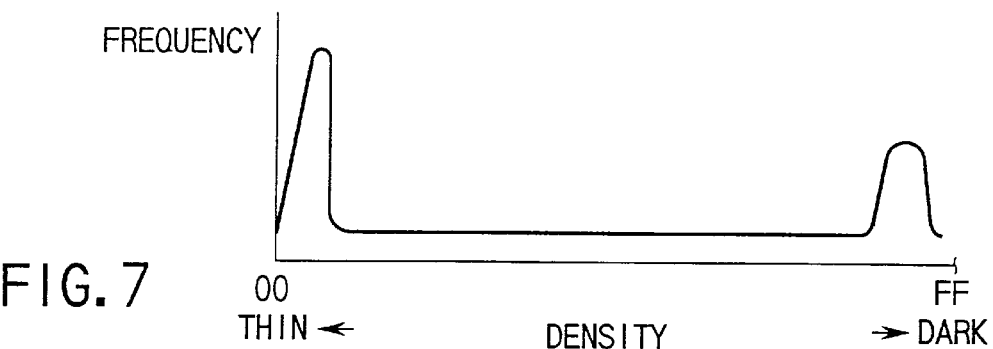
FIG. 7
| NUMBER OF LINES | α |
|---|---|
| 1 | 1 |
| 2 | 1/2 |
| 3 | 1/2 |
| 4 | 1/4 |
| 5 | 1/4 |
| 6 | 1/4 |
| 7 | 1/4 |
| 8 | 1/8 |
| ⋮ | ⋮ |
| 16 | 1/16 |
| ⋮ | ⋮ |
| 32 | 1/32 |
| ⋮ | ⋮ |
| 4096 | 1/4096 |
| ⋮ | ⋮ |
| 8192 | 1/8192 |
FIG. 8

| FDAT | 0 | 1~2 | 3~6 | 7~E | F~1E | 1F~3E | 3F~7E | 7F~FE | FE~1FE | 1FF~3FE | 3FF~7FE | 7FF~FFE | FFF~1FFE | 1FFF |
|---|---|---|---|---|---|---|---|---|---|---|---|---|---|---|
| CDT 20 23 | 0 | 1 | 2 | 3 | 4 | 5 | 6 | 7 | 8 | 9 | A | B | C | D |
| XDAT | 2000H | 1000H | 800H | 400H | 200H | 100H | 80H | 40H | 20H | 10H | 8H | 4H | 2H | 1H |
| SSLO 3 | 0 | 1 | 2 | 3 | 4 | 5 | 6 | 7 | 8 | 9 | A | B | C | D |
| SDT | 0 | a/2 | a/2² | a/2³ | a/2⁴ | a/2⁵ | a/2⁶ | a/2⁷ | a/2⁸ | a/2⁹ | a/2¹⁰ | a/2¹¹ | a/2¹² | a/2¹³ |

| f(i−1, j−1) | f(i, j−1) | f(i+1, j−1) |
|---|---|---|
| f(i−1, j) | f(i, j) | f(i+1, j) |
| f(i−1, j+1) | f(i, j+1) | f(i+1, j+1) |

FIG. 17

| Ld | Lb | Ld |
|---|---|---|
| Lc | La | Lc |
| Ld | Lb | Ld |

FIG. 18

| Hd | Hb | Hd |
|---|---|---|
| Hc | Ha | Hc |
| Hd | Hb | Hd |

FIG. 19

| | INPUT IMAGE DATA (ORIGINAL IMAGE DATA) | IMAGE DATA SUBJECTED TO RANGE CORRECTION PROCESS | IMAGE DATA SUBJECTED TO MULTIPLYING PROCESS | IMAGE DATA SUBJECTED TO SYNTHESIZING PROCESS |
|---|---|---|---|---|
| IMAGE DATA 1 | IMAGE DATA 1a<br>FA FA FA<br>FA FA FA<br>FA FA FA | IMAGE DATA 1b<br>FF FF FF<br>FF FF FF<br>FF FF FF | IMAGE DATA 1c<br>00 00 00<br>00 00 00<br>00 00 00 | IMAGE DATA 1d<br>FF FF FF<br>FF FF FF<br>FF FF FF |
| IMAGE DATA 2 | IMAGE DATA 2a<br>FF FF FF<br>FF FA FF<br>FF FF FF | IMAGE DATA 2b<br>FF FF FF<br>FF FF FF<br>FF FF FF | IMAGE DATA 2c<br>03 00 03<br>00 -0A 00<br>03 00 03 | IMAGE DATA 2d<br>FF FF FF<br>FF F5 FF<br>FF FF FF |
| IMAGE DATA 3 | IMAGE DATA 3a<br>05 05 05<br>05 05 05<br>05 05 05 | IMAGE DATA 3b<br>00 00 00<br>00 00 00<br>00 00 00 | IMAGE DATA 3c<br>00 00 00<br>00 00 00<br>00 00 00 | IMAGE DATA 3d<br>00 00 00<br>00 00 00<br>00 00 00 |
| IMAGE DATA 4 | IMAGE DATA 4a<br>00 00 00<br>00 05 00<br>00 00 00 | IMAGE DATA 4b<br>00 00 00<br>00 00 00<br>00 00 00 | IMAGE DATA 4c<br>-03 00 -03<br>00 0A 00<br>-03 00 -03 | IMAGE DATA 4d<br>00 00 00<br>00 0A 00<br>00 00 00 |

FIG. 20

IMAGE PROCESSING SYSTEM TO CORRECT THE DENSITY RANGE OF IMAGE DATA AND PERFORM FILTERING PROCESSING ON IMAGE DATA

BACKGROUND OF THE INVENTION

The present invention relates to an image processing system, and more particularly to an image processing apparatus capable of outputting image data supplied from a scanner with a high quality by subjecting supplied image data to various filtering processes and by synthesizing image data subjected to the filtering processes so as to output synthesized image data, and to an image processing method therefor. More particularly, the present invention relates to an image forming apparatus using the image processing apparatus.

In recent years, image forming apparatus, such as digital copying machines and facsimile machines, have been significantly widely used. The digital apparatus of the foregoing type must perform image processes for outputting an image supplied from a scanner and having a high quality. In general, image input/output apparatuses, such as the digital copying machines and facsimile machines, suffer from a problem of deterioration in the quality of an input image occurring attributable to the MTF (Modulation Transfer Function) of the optical system and deterioration in the quality of an input image occurring attributable to generation of return distortion because of limitation of the frequency range required to perform digital sampling. When an image is output, there arises a problem in that the quality of the image deteriorates owing to the developing system and to the spatial frequency characteristic, such as generation of moire peculiar to a digital process.

Therefore, the MTF correction must be performed as a portion of the processes of the image processing system. The foregoing MTF correction includes a filtering process. The filtering process is classified into a low pass filtering process for preventing moire or the like and a high pass filtering process for highlighting edges of characters or the like. In general, the filtering process is realized by a two-dimensional digital filtering process which is performed in the main scanning direction and the subscanning direction. That is, the filtering process is performed by multiplying pixels in a local region with corresponding coefficients, the pixels in the local region being composed of a pixel of interest, which must be processed, and pixels surrounding the pixel of interest. Therefore, when the filtering process is performed in such a manner that the matrix size is (n×n), the process in the sub-scanning direction requires a line buffer for n lines.

To perform the low pass filtering process and the high pass filtering process, a structure for reducing the cost and simplifying the structure of the hardware has been suggested in which a line buffer is shared by the low pass filtering process and the high pass filtering process. That is, the line buffer is shared so that the low pass filtering process and the high pass filtering process are performed in parallel to each other. After the low pass filtering process has been ended, image data subjected to the low pass filtering process is subjected to a range correction process. After the high pass filtering process has been ended, a weighting and multiplying process is performed. Image data subjected to the range correction process and image data subjected to the weighting and multiplying process are synthesized, and then synthesized image data is output.

However, the synthesizing process sometimes results in inversion (hereinafter described as a "density inversion phenomenon") of the density between specific image data including edge components and specific image data including no edge component from a macroscopic viewpoint (that is, the density is substantially inverted). The above-mentioned phenomenon becomes conspicuous in proportion to the resolution and the realized level of the gradation of the printer system.

The density inversion phenomenon will briefly be described. Initially, a region from a lowest density level to a highest density level, which are the subjects of the density levels, is uniformly divided into 256 steps (00h to FFh). The lowest density level is made to be 00h and the highest density level is made to be FFh. Then, first image data containing no edge components and second image data containing edge component are considered.

An assumption is made that first image data is a 3×3 matrix composed of pixels having a density light of FAh. On the other hand, second image data is a 3×3 matrix composed of a pixel of interest having a density level of FAh and pixels surrounding the pixel of interest and each having a density level of FFh (the center of the pixel matrix is the pixel of interest). That is, from a macroscopic viewpoint, the density level of second image data is (substantially) higher than the density level of first image data.

An assumption is made that first image data is subjected to a predetermined low pass filtering process, and then subjected to a predetermined range correction process so that a 3×3 pixel matrix composed of density level of FFh is obtained. Another assumption is made that first image data is subjected to a predetermined high pass filtering process, and then subjected to a predetermined multiplying process so that a 3×3 pixel matrix having highlighted edges is obtained. Since first image data does not contain any edge component, the obtained 3×3 pixel matrix does not include the density level having a minus component. When first image data subjected to the range correction process and second image data subjected to the multiplying process are synthesized, a 3×3 pixel matrix composed of the density level FFh is obtained. Therefore, image data is obtained by the synthesizing process which is a 3×3 pixel matrix composed of a pixel of interest having the density level of FFh.

An assumption is made that second image data is subjected to a predetermined low pass filtering process, and then subjected to a predetermined range correction process so that a 3×3 pixel matrix composed of density level of FFh is obtained. Another assumption is made that second image data is subjected to a predetermined high pass filtering process, and then subjected to a predetermined multiplying process so that a 3×3 pixel matrix having highlighted edges is obtained. The density level of the pixel of interest in the 3×3 pixel matrix has minus components. When second image data subjected to the range correction process and second image data subjected to the multiplying process are synthesized, the pixel of interest, which must be processed with the density level FFh, is undesirably processed with a density level which is lower than the density level FFh. Therefore, image data is obtained by the synthesizing process which is a 3×3 pixel matrix composed of a pixel of interest having the density level of, for example, FAh, and pixels surrounding the pixel of interest and having the density level of FFh.

When the density of first image data and second image data subjected to the synthesizing process are compared with each other, it can be understood that the density level of second image data is, from a macroscopic viewpoint (that is, substantially), lower than the density level of first image data. That is, a fact can be understood that the synthesizing process results in the density level of first image data and the density level of second image data being inverted. The density inversion phenomenon becomes conspicuous in a portion in which the density is moderately changed. The phenomenon is one of causes of deterioration in the quality of the formed image data. Facsimile machines, capable of lowering the resolution by converting the resolution, suffers from a problem in that the local region, in which the density is inverted, is enlarged in the above-mentioned case and thus the deterioration in the quality of the formed image becomes excessive.

BRIEF SUMMARY OF THE INVENTION

To overcome the above-mentioned problems, an object of the present invention is to provide an image processing apparatus and an image processing method which have a hardware structure in which a range correction process is performed after a low pass filtering process has been performed and a weighting process is performed after a high pass filtering process has been performed and which are capable of preventing the density inversion phenomenon occurring attributable to synthesis of image data subjected to the range correction process and image data subjected to the weighting process. Another object of the present invention is to provide an image forming apparatus using the image processing apparatus.

According to one aspect of the present invention, there is provided an image processing apparatus for processing original image data, having a given density range, with a predetermined manner to provide processed image data, comprising: means for correcting the density range of the image data to provide density-range-corrected image data corresponding to a distribution of the density of the image data; means for filtering the image data to generate filtered image data; means for synthesizing the density-range-corrected image data provided by the correcting means and the filtered image data provided by the filtering means so as to provide synthesized image data; and means for selecting either one of the density-range-corrected image data provided by the correcting means and the synthesized image data provided by the synthesizing means, in accordance with the density range of the density-range-corrected image data, so as to provide selected image data as the processed image data.

According to another aspect of the present invention, there is provided an image forming apparatus comprising: means for reading an image and converting read image into a digital signal to provide the digital signal as image data; means for correcting the density range of the image data to provide density-range-corrected image data corresponding to a distribution of the density of the image data; means for filtering the image data to generate filtered image data; means for synthesizing the density-range-corrected image data provided by the correcting means and the filtered image data provided by the filtering means so as to provide synthesized image data; means for selecting either one of the density-range-corrected image data provided by the correcting means and the synthesized image data provided by the synthesizing means, in accordance with the density range of the density-range-corrected image data, so as to provide selected image data; and means for forming an image in accordance with selected image data to output formed image.

According to another aspect of the present invention, there is provided an image processing method comprising the step of: first step for correcting the density range of the image data to provide density-range-corrected image data corresponding to a distribution of the density of the image data; second step for filtering the image data to generate filtered image data; third step for synthesizing the density-range-corrected image data provided by the first step and the filtered image data provided by the second step so as to provide synthesized image data; and fourth step for selecting either one of the density-range-corrected image data provided by the first step and the synthesized image data provided by the third step, in accordance with the density range of the density-range-corrected image data, so as to provide selected image data.

As a result of the above-mentioned means, the following effects can be obtained.

The image processing apparatus, the image processing method and the image forming apparatus according to the present invention have the structure such that either image data subjected to the range correction process or synthesized image data corresponding to image data subjected to the range correction process is selected and output in accordance with the density level of image data subjected to the range correction process. Specifically, if the density inversion phenomenon takes place after the synthesizing process, synthesized image data is output. If the density inversion phenomenon takes place after the synthesizing process, image data subjected to the range correction process is output. As a result, the density inversion phenomenon which can be generated attributable to the synthesizing process can be prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a graph showing a correction reference value calculated by a correction reference value calculating section and a range correction process which is performed in a range correction section;

FIG. 7 is a graph showing a correction reference value calculated by the correction reference value calculating section and the range correction process which is performed in the range correction section;

FIG. 8 is a table showing the number of sub-scanning lines and coefficient α corresponding to the number of lines when the mode is mode 0;

FIG. 17 is a table showing each pixel value in local region of image data;

FIG. 18 is a table showing examples of coefficients of a low pass filter;

FIG. 19 is a table showing examples of coefficients of a high pass filter;

FIG. 20 is a table showing an example of a density inversion phenomenon; and

DETAILED DESCRIPTION OF THE INVENTION

An embodiment of the present invention will now be described with reference to the drawings.

Figure 1:
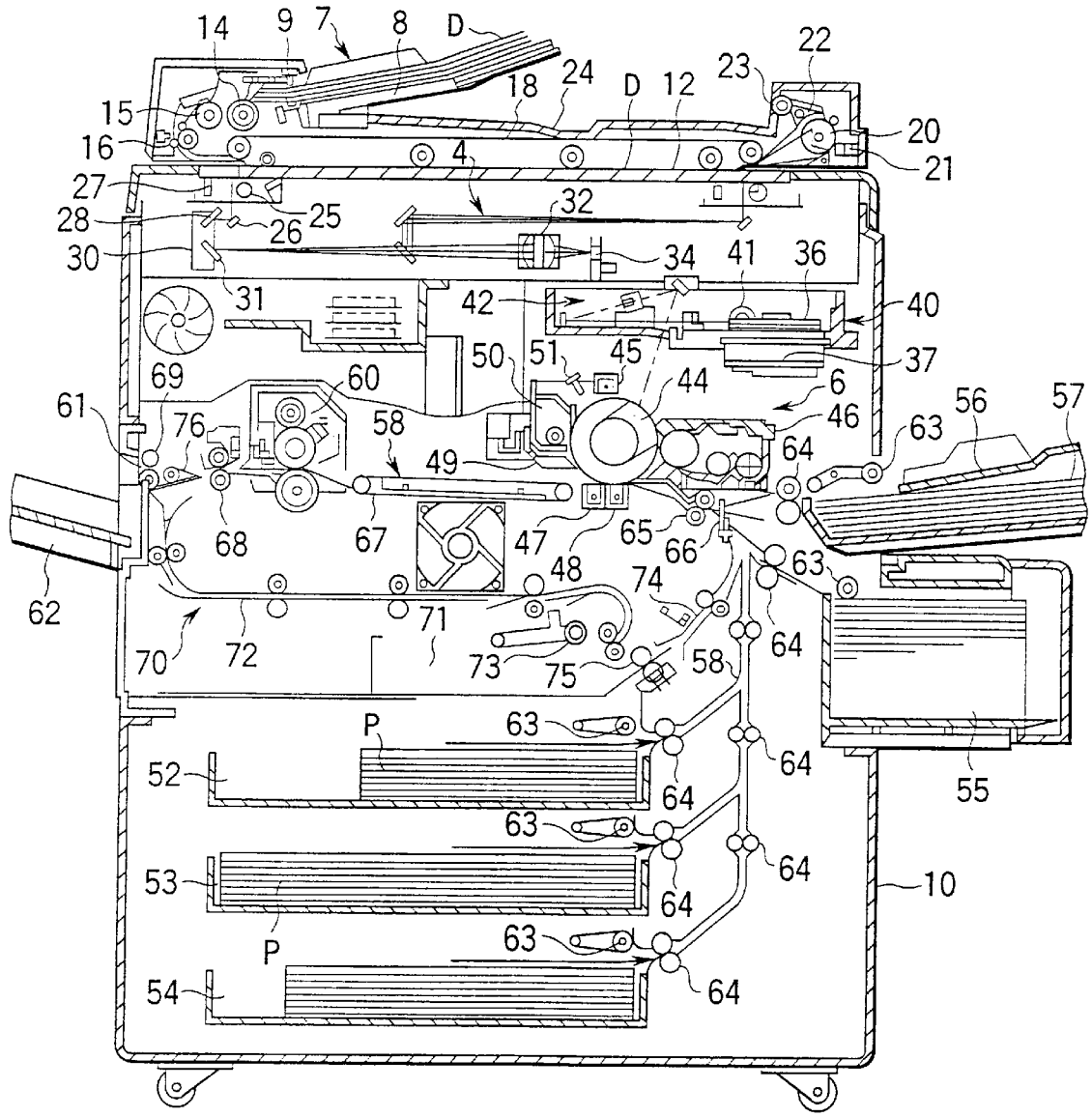
FIG. 1 is a diagram showing the schematic structure of a digital copying machine serving as an image forming apparatus according to an embodiment of the present invention.

FIG. 1 is a diagram showing a digital copying machine which is an image forming apparatus according to the embodiment of the present invention.

As shown in FIG. 1, the digital copying machine comprises an apparatus body 10. The apparatus body 10 includes a scanner section 4 serving as an image reading means and a printer section 6 serving as an image forming means.

A original-document retainer 12, on which a subject which must be read, that is, an original document D, is placed and which is made of a transparent glass plate, is disposed on the upper surface of the apparatus body 10. Moreover, an automatic original document feeding apparatus (hereinafter called as an "ADF") 7 for automatically feeding the original document to the upper surface of the original-document retainer 12 is disposed on the upper surface of the apparatus body 10. The ADF 7 can be opened/closed with respect to the original-document retainer 12 so as to also serve as an original document retainer for pressing the original document D placed on the original-document retainer 12 against the original-document retainer 12.

The ADF 7 has an original-document tray 8, an empty sensor 9, a pickup roller 14, a paper feeding roller 15, an aligning roller pair 16 and a conveyance belt 18. The original-document tray 8 receives the original document D set by a user. The empty sensor 9 detects existence of an original document. The pickup roller 14, one by one, takes the original document sheets from the original-document tray 8. The paper feeding roller 15 moves the taken original document. The aligning roller pair 16 aligns the leading end of the original document. The conveyance belt 18 is disposed to substantially fully cover the original-document retainer 12 to move the original document. The original document composed of a plurality of paper sheets and set on the original-document tray 8 is, from the lowermost page, that is, the final page, sequentially taken out, and then aligned by the aligning roller pair 16. Then, the original document is moved to a predetermined position on the original-document retainer 12 by the conveyance belt 18.

A reverse roller 20, a non-reverse sensor 21, a flapper 22 and a paper discharge roller 23 are disposed at an end of the ADF 7 opposite to the aligning roller pair 16. The original document D read by a scanner section 4, to be describe later, is supplied from the upper surface of the original-document retainer 12 by the conveyance belt 18, and then allowed to pass through the reverse roller 20, the non-reverse sensor 21 and flapper 22. Thus, the original document D is discharged onto an original-document discharge section 24 on the upper surface of the ADF 7. When the reverse side of the original document D is read, the flapper 22 is switched so that the original document D moved by the conveyance belt 18 is reversed by the reverse roller 20. Then, the original document D is moved to a predetermined position on the original-document retainer 12 by the conveyance belt 18.

The scanner section 4 disposed in the apparatus body 10 is provided with an exposing lamp 25 serving as a light source for illuminating the original document D placed on the original-document retainer 12; and a first mirror 26 for deflecting light reflected by the original document D into a predetermined direction. Specifically, the exposing lamp 25 and the first mirror 26 are attached to a first carriage 27 disposed below the original-document retainer 12.

The first carriage 27 is disposed in parallel to the original-document retainer 12. The first carriage 27 is able to reciprocate below the original-document retainer 12 by a drive motor through a toothed belt (not shown).

A second carriage 28 capable of moving in parallel to the original-document retainer 12 is disposed below the original-document retainer 12. A second mirror 30 and a third mirror 31 for sequentially deflecting light reflected by the original document D deflected by the first mirror 26 are attached to the second carriage 28 to be perpendicular to each other. The second carriage 28 is, by the toothed belt for driving the first carriage 27, moved to follow the first carriage 27. Moreover, the second carriage 28 is moved in parallel to the original-document retainer 12 at speed which is half the speed of the first carriage 27.

An image forming lens 32 for converging light beams reflected by a third mirror 31 disposed above the second carriage 28 and a CCD sensor 34 for receiving reflected light converged by the image forming lens 32 to photoelectrically convert reflected light are disposed below the original-document retainer 12. The image forming lens 32 is, by a drive mechanism, movably disposed in a plane including the optical axis of light deflected by the third mirror 31. When the image forming lens 32 is moved, reflected light is image-formed on a light receiving surface of the CCD sensor 34 with a required magnification. The CCD sensor 34 photoelectrically converts incidental reflected light to output an electric signal corresponding to the read original document D.

On the other hand, the printer section 6 has a laser exposing section 40. The laser exposing section 40 has a semiconductor laser unit 41, a polygonal mirror 36, a polygonal-mirror motor 37 and an optical system 42. The polygonal mirror 36 is a scanning member for sequentially deflecting a laser beam emitted from the semiconductor laser unit 41. The polygonal-mirror motor 37 rotates the polygonal mirror 36 at a predetermined number of revolutions. The optical system 42 deflects the laser beam deflected by the polygonal mirror 36 to introduce the laser beam into the surface of a photosensitive drum 44 to be described later. The laser exposing section 40 having the above-mentioned structure is secured and supported by a support frame (not shown) of the apparatus body 10.

The semiconductor laser unit 41 is turned on/off in accordance with image data of the original document D read by the scanner section 4 or information of a document to be transmitted or received by the facsimile function. The laser beam output from the semiconductor laser unit 41 because of the foregoing ON/OFF control is allowed to pass through the polygonal mirror 36 and the optical system 42, and then directed to the photosensitive drum 44. The laser beam is used to scan the outer surface of the photosensitive drum 44 so that an electrostatic latent image is formed on the outer surface of the photosensitive drum 44.

The printer section 6 is provided with the rotative photosensitive drum 44 serving as an image carrier disposed at substantially the center of the apparatus body 10. The outer surface of the photosensitive drum 44 is exposed to the laser beam emitted from the laser exposing section 40 so that a required electrostatic latent image is formed. Around the photosensitive drum 44, there are sequentially disposed an electrostatic charger 45, a developing unit 46, a separation charger 47, a transfer charger 48, a separation claw 49, a cleaning section 50 and a destaticizer 51. The electrostatic charger 45 electrically charges the outer surface of the photosensitive drum 44 to a predetermined charge level. The developing unit 46 supplies toner serving as a developing material to the electrostatic latent image formed on the photosensitive drum 44 to develop the electrostatic latent image to have a predetermined image density. The separation charger 47 separates a transfer member fed from a paper cassette, to be described later, that is, copying paper P from the photosensitive drum 44. The transfer charger 48 transfers a toner image formed on the photosensitive drum 44 to the copying paper P. The separation claw 49 separates the copying paper P from the surface of the photosensitive drum 44. The cleaning section 50 cleans toner left on the surface of the photosensitive drum 44. The destaticizer 51 destaticizes the surface of the photosensitive drum 44.

An upper cassette 52, a middle cassette 53 and a lower cassette 54 each of which can be drawn out from the apparatus body 10 and which are stacked up are disposed in the lower portion of the apparatus body 10. Copying paper sheets having different sizes are enclosed in the foregoing cassettes 52, 53 and 54. A large-capacity feeder 55 is disposed on the side of the cassettes 52, 53 and 54, the large-capacity feeder 55 accommodating copying paper P which is used frequently, for example, A4-size copying paper P by about 3,000 sheets. Moreover, a paper feeding cassette 57 also serving a manual feeding tray 56 is detachably loaded into a position above the large-capacity feeder 55.

In the apparatus body 10, there is formed a conveyance passage 58 extending from each cassette and the large-capacity feeder 55 to pass through a transferring section formed between the photosensitive drum 44 and the transfer charger 48. A fixing unit 60 is disposed at a trailing end of the conveyance passage 58. A discharge opening 61 is formed in the side wall of the apparatus body 10 confronting the fixing unit 60. A paper discharge tray 62 is loaded into the discharge opening 61.

A pickup roller 63 for, one by one, taking out the copying paper P from the cassette or the large-capacity feeder 55 is disposed adjacent to each of the upper cassette 52, the middle cassette 53, the lower cassette 54, the paper feeding cassette 57 and the large-capacity feeder 55. Moreover, the conveyance passage 58 has a multiplicity of paper feeding roller pairs 64 for moving, through the conveyance passage 58, the copying paper P taken by the pickup roller 63.

In the conveyance passage 58, a resist roller pair 65 is disposed upstream from the photosensitive drum 44. The resist roller pair 65 corrects the inclination of the taken copying paper P and makes coincide the leading end of the toner image on the photosensitive drum 44 and the leading end of the copying paper P with each other so as to feed the copying paper P to the transferring section at the same speed at which the outer surface of the photosensitive drum 44 is rotated. A sensor 66 in front of aligning section for detecting arrival of the copying paper P is disposed on this side of the resist roller pair 65, that is, at a position adjacent to the paper feeding roller pairs 64.

The copying paper P, one by one, taken out from any one of the cassettes or the large-capacity feeder 55 by the pickup roller 63 is moved to the resist roller pair 65 by the paper feeding roller pairs 64. The leading end of the copying paper P is adjusted by the resist roller pair 65, and then moved to the transferring section.

In the transferring section, the developer image formed on the photosensitive drum 44, that is, the toner image is transferred to the copying paper P by the transfer charger 48. The copying paper P on which the toner image has been transferred thereto is, by the separation charger 47 and the separation claw 49, separated from the surface of the photosensitive drum 44, and then moved to the fixing unit 60 through a conveyance belt 67 forming a portion of the upper cassette 52. The developer image is melted and fixed to the copying paper P by the fixing unit 60. Then, the copying paper P is discharged onto the paper discharge tray 62 through the discharge opening 61 by the paper feeding roller pair 68 and the paper discharge roller pair 69.

An automatic double-side apparatus 70 for reversing the copying paper P allowed to pass through the fixing unit 60 and moving the copying paper P to the resist roller pair 65 is disposed below the conveyance passage 58. The automatic double-side apparatus 70 has a temporary accumulation section 71, a reverse passage 72, a pickup roller 73 and a paper feeding roller 75. The temporary accumulation section 71 is used to temporarily accumulate the copying paper P. The reverse passage 72 is branched from the conveyance passage 58 to reverse the copying paper P so that the copying paper P is introduced into the temporary accumulation section 71. The resist roller pair 65, one by one, takes out the copying paper P accumulated in the temporary accumulation section 71. The paper feeding roller 75 feeds the copying paper P to the resist roller pair 65 through a conveyance passage 74. An assigning gate 76 for selectively assigning the copying paper P to the discharge opening 61 or the reverse passage 72 is disposed in a portion in which the conveyance passage 58 and the reverse passage 72 are branched from each other.

When a double side copying operation is performed, the copying paper P allowed to pass through the fixing unit 60 is introduced into the reverse passage 72 by the assigning gate 76. Then, the sheets of the copying paper P in a turned over state are temporarily stacked in the temporary accumulation section 71. Then, the copying paper P is moved to the resist roller pair 65 through the conveyance passage 74 by the pickup roller 73 and the paper feeding roller 75. Then, the position of the copying paper P is adjusted by the resist roller pair 65, and then again moved to the transferring section. Thus, the toner image is transferred to the reverse side of the copying paper P. Then, the copying paper P is discharged onto the paper discharge tray 62 through the conveyance passage 58, the fixing unit 60 and the paper discharge roller pair 69.

Figure 2:
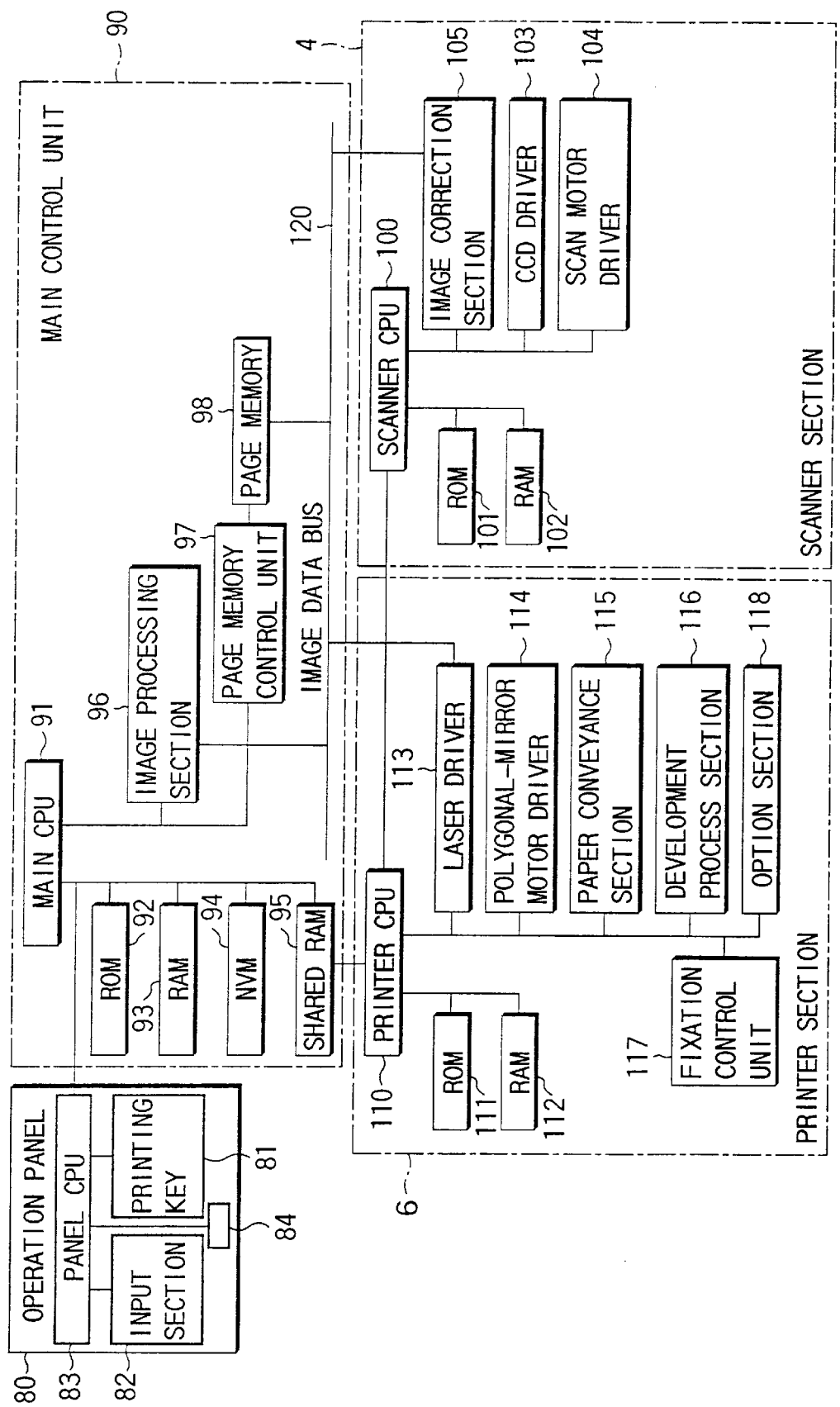
FIG. 2 is a block diagram showing a control system of the digital copying machine.

The digital copying machine also has an operating panel 80 and a main control section 90 as shown in FIG. 2.

The operation panel 80 has a printing key 81, an input section 82, a panel CPU 83 and a ten key pad 84. The printing key 81 is used to input an instruction to start the copying operation. The input section 82 is used to input various instructions for the digital copying machine, the input section 82 having button switches (not shown) and a touch panel 82a. The touch panel 82a is used to determine the copying magnification, instruct to perform a partial copying operation, instruct a region which must be partially copied, and determine/change an upper density threshold and a lower density threshold to be described later. The panel CPU 83 totally controls the operation panel 80. The ten key pad 84 is used to set the number of copies.

Referring to FIG. 2, a control system for the digital copying machine shown in FIG. 1 will now be described.

As shown in FIG. 2, the digital copying machine has three CPUs which are a main CPU 91 in a main control unit 90, a scanner CPU 100 in the scanner section 4 and a printer CPU 110 in the printer section 6.

The main CPU 91 performs a bidirectional communication with the printer CPU 110 through a shared RAM 95 in such a manner that the main CPU 91 issues an instruction to perform the operation. In response to this, the printer CPU 110 returns status information. The printer CPU 110 and the scanner CPU 100 performs a serial communication in such a manner that the printer CPU 110 issues an instruction to perform the operation. In response to this, the scanner CPU 100 returns status information. Note that the operation panel 80 is connected to the main CPU 91.

The main control unit 90 is provided with the main CPU 91, a ROM (Read Only Memory) 92, a RAM (Random Access Memory) 93, a NVM (Non-Volatile random access Memory) 94, the shared RAM 95, an image processing section 96, a page memory control unit 97, a page memory 98 and an image synthesizing section 99.

The main CPU 91 totally controls the main control unit 90. In the ROM 92, a control program is stored. The RAM 93 is used to temporarily store data. The NVM 94 is a nonvolatile memory backed up by a battery to be capable of saving data on the NVM 94 when the power supply has been interrupted. The shared RAM 95 is used to perform bidirectional communication between the main CPU 91 and the printer CPU 110.

The image processing section 96 subjects image data supplied from the scanner section 4 to various image processes, for example, a filtering process, a range correction process, a weighting process and a synthesizing process to be described later. The page memory control unit 97 stores image data in the page memory 98 and reads image data stored in the page memory 98. The page memory 98 has a capacity capable of storing image data for a plurality of pages in such a manner that compressed image data is stored for each page.

The scanner section 4 is provided with the scanner CPU 100, a ROM 101, a RAM 102, a CCD driver 103, a scan motor driver 104, an image correction section 105 and the like. The scanner CPU 100 totally controls the scanner section 4. The ROM 101 is used to store a variety of control programs. The CCD driver 103 operates the CCD sensor 34. The scan motor driver 104 controls motors for moving the exposing lamp 25 and the mirrors 26, 27 and 28. The image correction section 105 is composed of an A/D conversion circuit for converting an analog signal supplied from the CCD sensor 34 into a digital signal, a shading correction circuit for correcting change in the threshold level of an output signal from the CCD sensor 34 occurring attributable to change in the atmospheric temperature and a line memory in which the digital signal subjected to the shading correction in the shading correction circuit is temporarily stored.

The printer section 6 is provided with the printer CPU 110, a ROM 111, a RAM 112, a laser driver 113, a polygonal-mirror motor driver 114, a paper conveyance section 115, a development process section 116, a fixation control unit 117 and an option section 118. The printer CPU 110 totally controls the printer section 6. The ROM 111 is used to record a variety of control programs. The laser driver 113 turns on/off the semiconductor laser unit 41 which emits a laser beam. The polygonal-mirror motor driver 114 controls rotations of the polygonal-mirror motor 37 of the laser unit 40. The paper conveyance section 115 controls conveyance of the copying paper P through the conveyance passage 58. The development process section 116 operates the electrostatic charger 45, the developing unit 46 and the transfer charger 48 to perform a developing process including charging, developing and transferring processes. The fixation control unit 117 controls the fixing unit 60.

The image processing section 96, the page memory 98, the image correction section 105 and the laser driver 113 are connected to one another by an image data bus 120.

Figure 3:
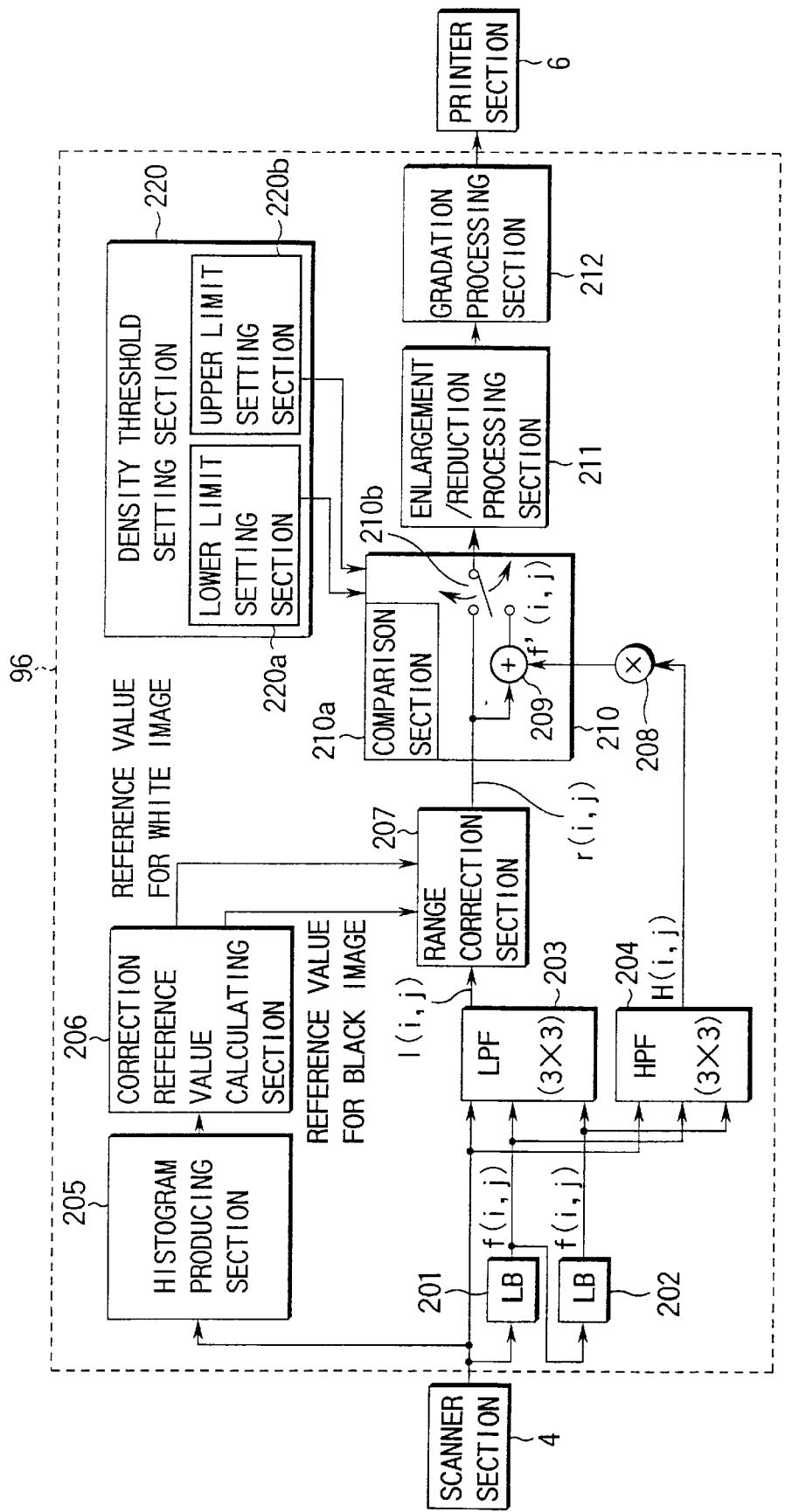
FIG. 3 is a diagram showing the schematic structure of an image processing section serving as an image processing apparatus according to the embodiment of the present invention.

Referring to FIG. 3, the image processing section 96 serving as the image processing unit will now be described.

The image processing section 96 is provided with a LB (line buffer) 201, a LB (line buffer) 202, a LPF (low pass filter) 203 serving as a first filtering means, a HPF (high pass filter) 204 serving as a second filtering means, a density histogram producing section 205, a correction reference value calculating section 206, a range correction section 207 serving as a correction means, a multiplier 208 serving as a multiplying means, an adder 209 serving as a synthesizing means, an output selection section 210 serving as a selecting means, an enlargement/reduction processing section 211, a gradation processing section 212 and a threshold setting section 220 serving as a sitting means.

The LB 201 is supplied with image data read and acquired by the scanner section 4. The LB 202 is supplied with image data read by the scanner section 4 and allowed to pass through the LB 201. The LPF 203 is supplied with image data read and acquired by the scanner section 4, image data supplied from the LB 201 and image supplied from the LB 202. The HPF 204 is connected in parallel to the LPF 203. Also the HPF 204 is supplied with image data read by the scanner section 4, image data supplied from the LB 201 and image data supplied from the LB 202. Thus-supplied image data is subjected to a high pass filtering process.

The low pass filtering process is a process for restraining a high frequency component (extracting a low frequency component) to prevent moire. As a result of the low pass filtering process, a first spatial frequency component is extracted from image data supplied to the LPF 203. That is, image data subjected to the low pass filtering process and having the first spatial frequency component is supplied from the LPF 203. The high pass filtering process is a process for intensifying the high frequency component (restraining the low frequency component) to highlight edges. As a result of the high pass filtering process, a second spatial frequency component higher than the first spatial frequency is extracted from image data supplied to the HPF 204. That is, image data subjected to the high pass filtering process and having the second spatial frequency component is supplied from the HPF 204.

The density histogram producing section 205 produces a density histogram in accordance with image data read by the scanner section 4. The correction reference value calculating section 206 calculates a correction reference value for use in a density correction process in accordance with the density histogram produced by the density histogram producing section 205. The range correction section 207 uses a reference value for a white image and a reference value for a black image which have been calculated by the correction reference value calculating section 206 and which are references value for the corrections to correct the density range of image data subjected to the low pass filtering process (that is, a real time and automatic density adjustment is performed). The range correction section 207 supplies image data subjected to the range correction process.

The multiplier 208 performs a weighting process in such a manner that image data subjected to the high pass filtering process is multiplied by weighting coefficient K. Therefore, the multiplier 208 outputs image data subjected to the multiplying process. The adder 209 adds (synthesizes) image data subjected to the range correction process and image data subjected to the multiplying process. Therefore, the multiplier 208 outputs synthesized image data.

The threshold setting section 220 is provided with a lower limit setting section 220a and an upper limit setting section 220b so that a threshold of the lowest density set to the lower limit setting section 220a and a threshold of the highest density set to the upper limit setting section 220b are supplied to the output selection section 210. The input section 82 of the operation panel 80 may be used to arbitrarily change the threshold of the lowest density set to the lower limit setting section 220a and the threshold of the highest density set to the upper limit setting section 220b.

The output selection section 210 is provided with a comparison section 210a. The comparison section 210a subjects, to a comparison, the density level of image data subjected to the range correction process and the threshold of the lowest density and the threshold of the highest density. In accordance with a result of the comparison supplied from the comparison section 210a, the switching circuit 210b in the output selection section 210 is used to select either image data subjected to the range correction process or synthesized image data. Then, selected image data is output.

In the enlargement/reduction processing section 211, selected image data output from the output selection section 210 is subjected to an enlargement/reduction process, if necessary. In the gradation processing section 212, image data output from the enlargement/reduction processing section 211 is subjected to a pseudo halftone process by using an error diffusion method or a dither method. Image data processed in the gradation processing section 212 is supplied to the printer section 6. The printer section 6 forms an image in accordance with supplied image data and outputs the formed image.

Note that the image processing section 96 is provided with a timing signal generating section (not shown) and a clock generating section (not shown). The timing signal generating section supplies various timing signals required for the blocks in the image processing section 96 in accordance with the clock signal supplied from the clock generating section.

Figures 4, 5:
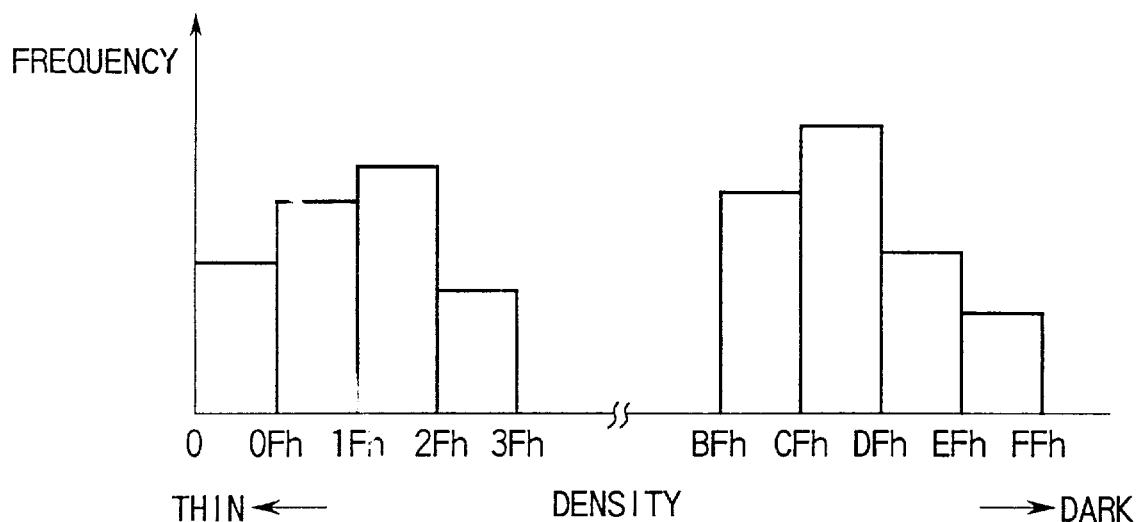
FIG. 4 is a graph showing an example of density histogram produced by a histogram producing section in accordance with image data read by a scanner.
FIG. 5 is a table showing the density histogram.

FIGS. 4 and 5 schematically show the density histogram produced by the density histogram producing section 205. When one A4-size (210 mm×297 mm) image is read at 400 dpi, the total number G of pixels is as follows:

$$G=210\times 197\times (400/25.4)^2 \quad (1)$$

Each of the pixels included in the image by the number G has a density. The density is expressed with 8 bits in this embodiment. The axis of abscissa of the graph shown in FIG. 4 stands for the density, while the axis of ordinate stands for the frequency (the number of pixels). In this embodiment, a region between a lowest density level and the highest density level, which are the subjects of the density levels, is uniformly divided into 256 steps (00h to FFh). The lowest density level is made to be density level 00h, while the highest density level is made to be density level FFh. FIG. 4 shows the relationship between the density and the frequency in such a manner that the 256 density levels are simplified into 16 density levels. By employing the division into 16 levels, the hardware can significantly be simplified and reduced in size. The division into 16 levels is sufficient to obtain the quantity of information to produce the histogram for use in the automatic density adjustment function. FIG. 5 shows a method of dividing the density into 16 levels, in which division No. 0 includes pixel values in a range from 00h to 0Fh and division No. 1 includes pixel values in a range from 10h to 1Fh. Similarly, ranges of the pixel values are determined to division No. FFh.

Prior to describing the density histogram producing section 205, the range correction operation performed by the correction reference value calculating section 206 and the range correction section 207 will now be described. The range correction function is a function for use in the automatic exposing function of an analog copying machine to cut the ground which is the background.

In general, when an original document is digitally read and a density histogram is produced, the density histogram is as shown in FIG. 6. If an original document is, for example, a newspaper having a considerably high density of the ground, one peak is formed in the ground density portion as indicated with a symbol M shown in FIG. 6. Moreover, another peak is formed in the character density portion as indicated with a symbol N. Although the analog copying machine erases the ground density portion by controlling the luminance of the exposing lamp, the digital copying machine obtains a similar effect by performing the following signal process.

To put it simply, densities DW and DB corresponding to the peak points M and N are obtained, followed by performing the following calculations. Thus, the density histogram is converted into a distribution as shown in FIG. 7. The densities DW and DB are called correction reference values. The density DW is called as a reference value for a white image, while the density DB is called as a reference value for a black image. The densities DW and DB are calculated by the correction reference value calculating section 206 in accordance with the histogram of each scanning line produced by the density histogram producing section 205.

$$DN=(DI-DW)\times FFh/(DB-DW) \quad (2)$$

where DI is the density of an input pixel, DN is the corrected density of the pixel and FFh is the highest density of the pixel. That is, the range (the width of the density) from M to N is extended to a range from 00h to FFh.

A method of producing the histogram will schematically be described. The following equation is a basic calculation for producing the histogram. The histogram is produced for each of the main scanning lines. Whenever the process for producing the histogram for one line is ended, a reference value for correcting the range is obtained. In accordance with the reference value, the range correction process is performed. Note that the total number of data items for forming the histogram is always constant.

$$A'=A-\alpha A+\alpha B \quad (3)$$

where

A'=corrected frequency (the number of pixels) corresponding to each density of the present line A=frequency corresponding to each frequency calculated to the previous line B=frequency corresponding each density of the present line α=weighting coefficient The weighting coefficient α is a value with which the frequency value accumulated in each line is multiplied, the value of a is set to correspond to the number of lines as shown in FIG. 8 and is selected from fourteen values (1, ½, ¼, ⅛, 1/16, 1/32, 1/2048, 1/4096 and 1/8192).

The density histogram producing section 205 will now be described. The density histogram producing section 205 calculates A'=(A')+αB for each input pixel during a process for reading one line. Then, the density histogram producing section 205 calculates the frequency (A')=A−αA for each density of the histogram in a period from reading of one line to reading of a next line, that is, in a period in which any density of the pixel is not input. As described above, the density histogram producing section 205 produces a corrected frequency value A'=A−αA+αB about the present line. The thus-produced histogram is used by the correction reference value calculating section 206 to calculate the reference value for correcting the range.

Two modes consisting of mode 0 and mode 1 are provided to produce the histogram so that either of the modes is selected:

Mode 0: addition mode which depends upon the number of sub-scanning lines and in which the weighting coefficient is varied.

Mode 1: addition mode in which the weighting coefficient for the input pixel is constant In the mode 0, the value of coefficient a is changed to correspond to the number of counts of the main scanning lines to produce the histogram. In the mode 1, the coefficient is made to be constant regardless of the count value of the main scanning lines to produce the histogram.

Figure 9:
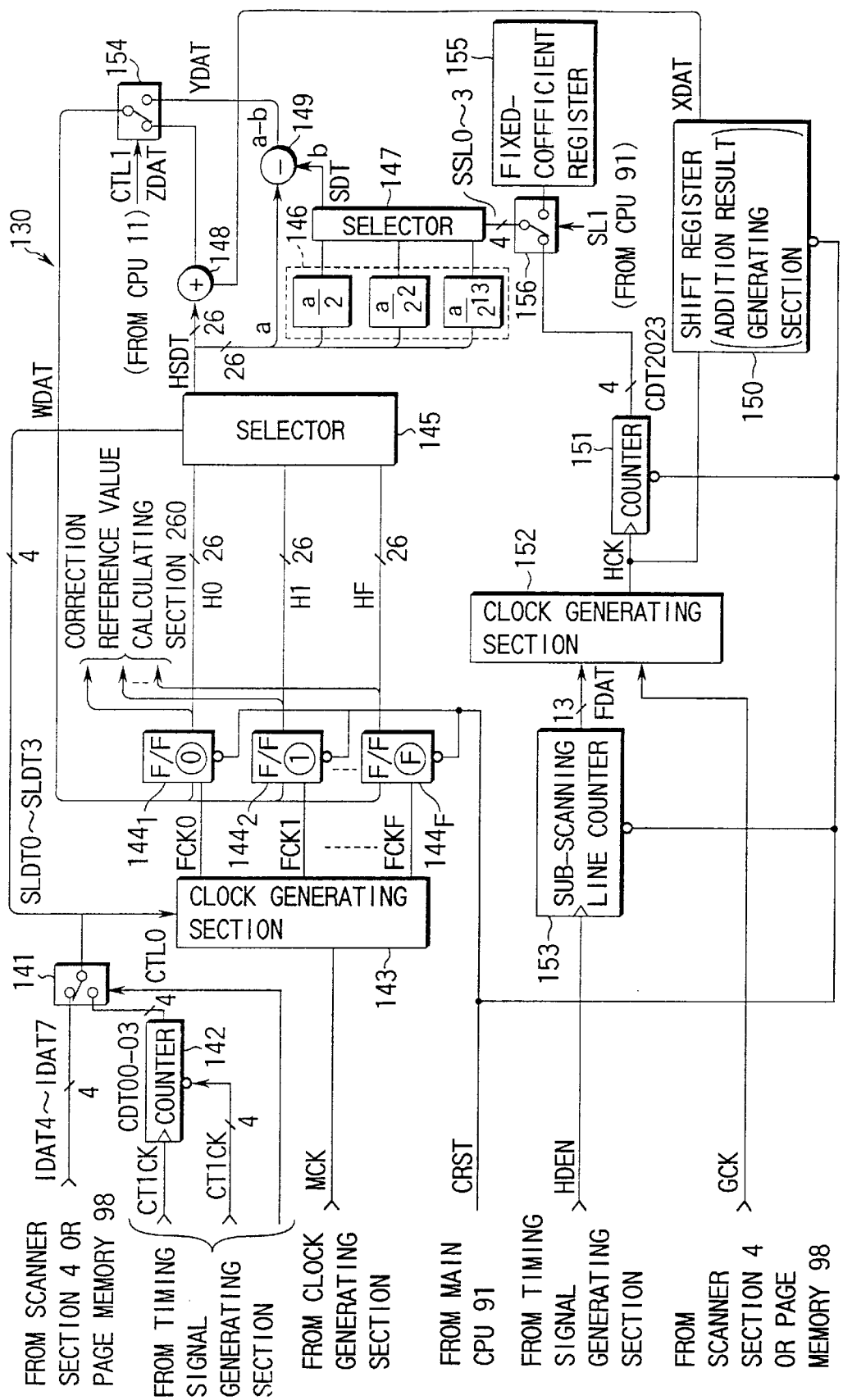
FIG. 9 is a block diagram showing the schematic structure of a histogram producing section.

FIG. 9 is a block diagram showing the detailed structure of the density histogram producing section 205. Pixel density signals IDAT4 to IDAT7 are supplied to one of terminals of a switch 141 from the scanner section 4, while signals CDT00 to CDT03 of output data from a counter 142 are supplied to another terminal. The switch 141 selects either of the foregoing input signals in response to a selection signal supplied from the timing signal generating section (not shown) to output the selected signals SLDT0 to SLDT3 to a selector 145 and the clock generating section (not shown). The pixel density signals IDAT4 to IDAT7 are upper four bits of the pixel density, and IDAT0 to IDAT3 are ignored. The timing signal CTL0 supplied from the timing signal generating section is made to be a high level between the lines, that is, in a period in which the pixel density signal is not being read. Thus, the switch 141 selects and outputs the signal supplied from the counter 142.

When "(A')=A−αA" is calculated, the counter 142 supplies a required value (a count value) to the clock generating section and the selector 145. When the pixel density is not being read, the counter 142 generates a four-bit count value for causing the output from the clock generating section to sequentially be selected and generated. The counter 142 is supplied with counter clock signal CTLCK from the timing signal generating section and is cleared in response to counter clear signal CTLCL supplied from the timing signal generating section. The counter clear signal CTLCL is made to be a low level when the pixel density signal is being read so that the counter 142 is cleared.

Figure 10:
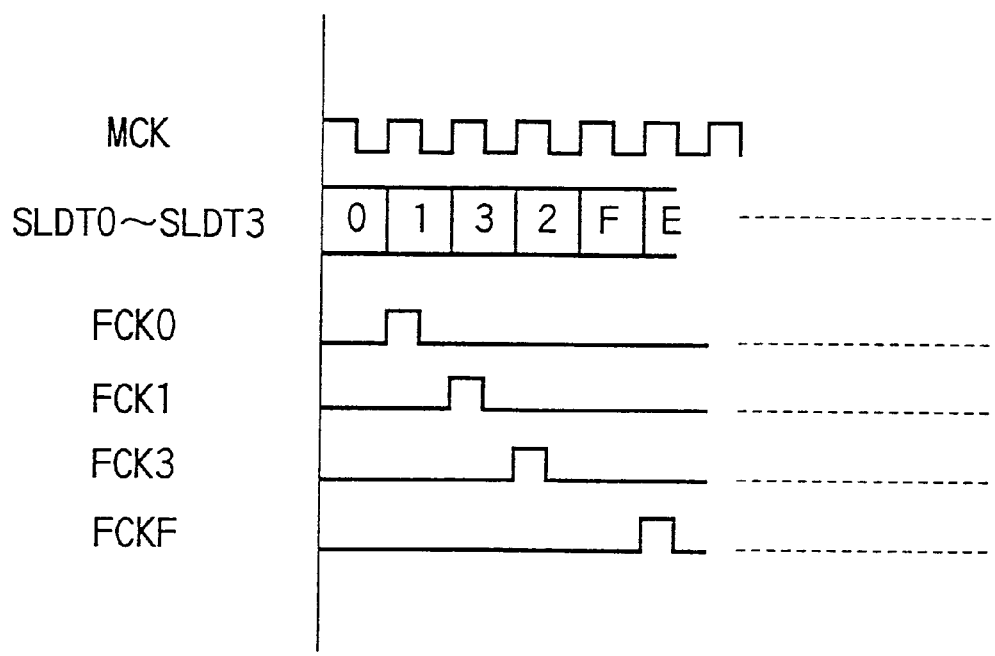
FIG. 10 is a graph showing timings of an output clock signal corresponding to the density of a supplied pixel in a clock generating section of the histogram producing section.

The clock generating section selects and outputs any one of sixteen outputs FCK0 to FCKF at the period of input clock signal MCK. FIG. 10 shows the relationship between input signals and output signals in the clock generating section.

Histogram registers (flip flops) $144_I$ to $144_F$ latch and output corrected frequency (WDAT) of each pixel density at the first transition of each of input clock signals FCK0 to FCKF. The input signal WDAT is the foregoing "A'−αA" or "(A')+αB". Corrected frequency signals H0 to HF supplied from the histogram registers $144_I$ to $144_F$ are also output to the correction reference value calculating section 206.

The selector 145 is supplied with the frequencies (the number of pixels) corresponding to the 16 levels of densities H0 to HF supplied from the histogram registers $144_I$ to $144_F$. In response to input signals SLDT0 to SLDT3 supplied from the switch 141, the selector 145 selects one data items (each of which has a bus width of 26 bits) from sixteen data items H0 to HF to output signal HSDT.

Figure 16:
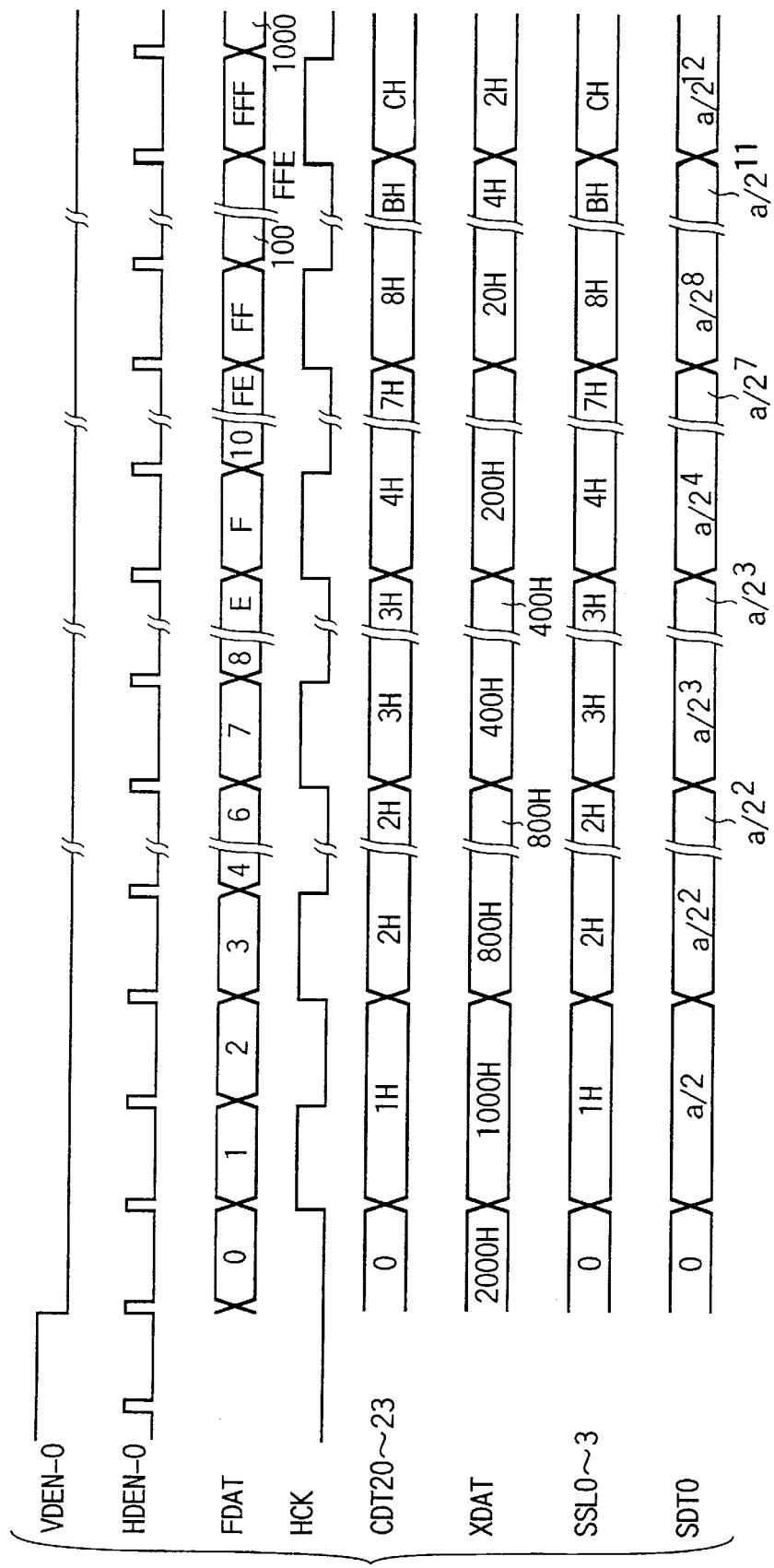
FIG. 16 is a timing chart continued from FIG. 15 and showing the operation of the histogram producing section.

A sub-scanning line counter 153 is supplied with line synchronizing signal HDEN from the timing signal generating section as shown in a timing chart shown in FIG. 16. In response to this, the sub-scanning line counter 153 outputs count value signals FDAT00 to FDAT12 to the clock generating section 152. The subscanning line counter 153 is cleared in response to clear signal CRST supplied from the main CPU 91 whenever one page of the original document is scanned.

The clock generating section 152 is supplied with output signals FDAT0 to FDAT12 from the sub-scanning line counter 153 and pixel synchronizing clock signal GCK from the scanner section 4. As a result, the clock generating section 512 outputs signal HCK to the counter 151 and the addition result generating section 150. When the value of the signal FDAT is any one of 1, 3, 7, F, 1F, 3F, 7F, 1FF, 3FF, 7FF, FFF or 1FFF, the clock generating section 152 outputs one clock of the input pixel synchronizing clock signal. When all of the line number signals FDAT are "1", that is, when FDAT=1, 3 (11), 7 (111), F (1111), . . . , the clock generating section 152 comprising an AND circuit outputs one clock.

The counter 151 is supplied with the clock signal HCK from the clock generating section 152. Thus, the counter 151 outputs count value signals CDT20 to CDT23 to the selector 147 when the mode is mode 0. Also the counter 151 is cleared for each page in response to the clear signal CRST supplied from the main CPU 91. The count values CDT20 to CDT23 are values for selecting a, as shown in FIG. 8.

A fixed-coefficient register 155 outputs a fixed coefficient when the mode is mode 1. A switch 156 is switched in response to mode signal SL1 supplied from the main CPU 91 in such a manner that the switch 156 is switched to the counter 151 when the mode is mode 0 and switched to the fixed-coefficient register 155 when the mode is mode 1.

A subtraction result generating section 146 outputs "αA" for use to calculate "(A')=A−αA". The subtraction result generating section 146 is supplied with the output signal HSDT from the selector 145 to generate a value obtained by dividing the signal HSDT by the power of 2 (shifts the signal HSDT).

In response to input signals SSL0 to SSL3, the selector 147 determines "αA" for use to calculate "(A')=A−αA" which is performed between lines, that is, when no pixel signal is being read. If the value of the input signals SSL0 to SSL3 is "1", the selector 147 outputs (the value of the signal HSDT)/2. If the input value is "2", the selector 147 outputs (the value of the signal HSDT)/22. If the input value is C, the selector 147 outputs (the value of the signal HSDT)/213.

A subtraction section 149 performs subtraction as "(A')= A−αA". The subtraction section 149 is supplied with the density signal HSDT (A in the foregoing equation) from the selector 145 and also supplied with subtraction number signal SDT (αA in the foregoing equation) from the selector 147 to output signal YDAT which is a result of the subtraction.

Figure 11:
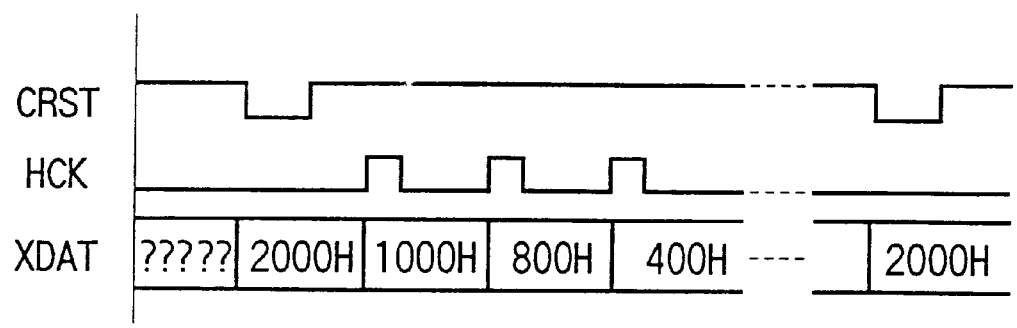
FIG. 11 is a graph showing an example of an output from an addition result generating section in the histogram producing section.
Figures 12, 13:
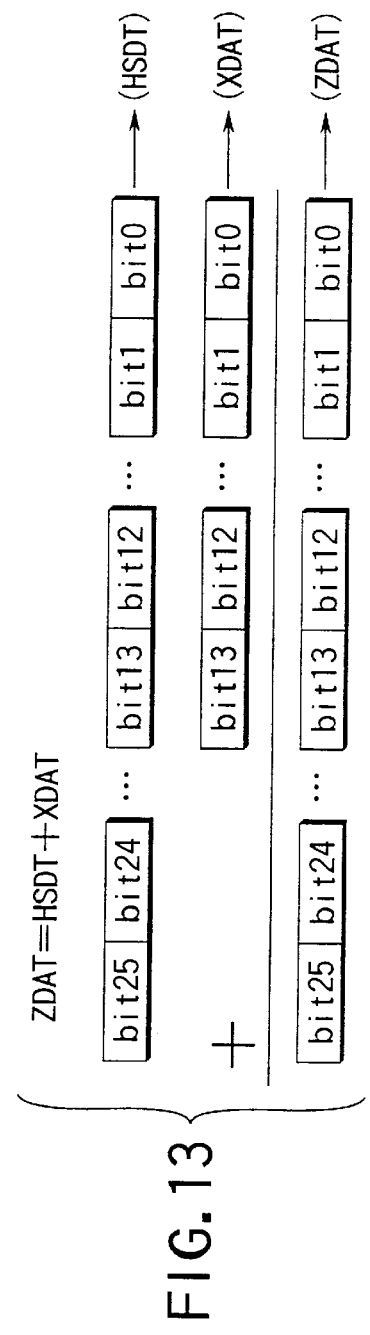
FIG. 12 is a table showing change in each signal corresponding to change in signal FDAT.
FIG. 13 is a diagram showing an example of addition of signal ZDAT.

An addition result generating section 150 generates "αB" for use to calculate "A'=(A')+αB". The addition result generating section 150 is supplied with the clock signal HCK from the clock generating section 152 and outputs signal XDAT to the adder section 148. Also the addition result generating section 150 is cleared for each page in response to the clear signal CRST supplied from the main CPU 91. FIG. 11 shows an example of the output from the addition result generating section 150. When the clear signal CRST is supplied, an initial value of 2000H is output. Whenever the clock signal HCK is supplied from the clock generating section 152, ½ of a present value is output. Since the output is a hexadecimal value, half of, for example, present value 2000H is 1000H, and half of present value 1000H is 800H. FIG. 12 shows change of each signal corresponding to change in the signal FDAT.

The adder section 148 performs addition A'−(A')+αB. The adder section 148 is supplied with the frequency signal HSDT from the selector 145 and addition data signal XDAT from the addition result generating section 150 to output signal ZDAT which is a result of the addition. FIG. 13 shows an example of additions indicated by the signal ZDAT.

A switch 154 switches the calculation between (A')=A−αA and A'=(A')+αB. One of the terminals of the switch 154 is supplied with the addition result signal ZDAT from the adder section 148, while another terminal of the same is supplied with subtraction result signal YDAT from the subtraction section 149. In response to selection signal CTL1, one of the signals is selected so that selection result signal WDAT is output to the histogram registers $144_I$ to $144_F$.

Production of the histogram having the structure shown in FIG. 9 will now be described with reference to a timing chart shown in FIGS. 14, 15 and 16.

Figure 14:
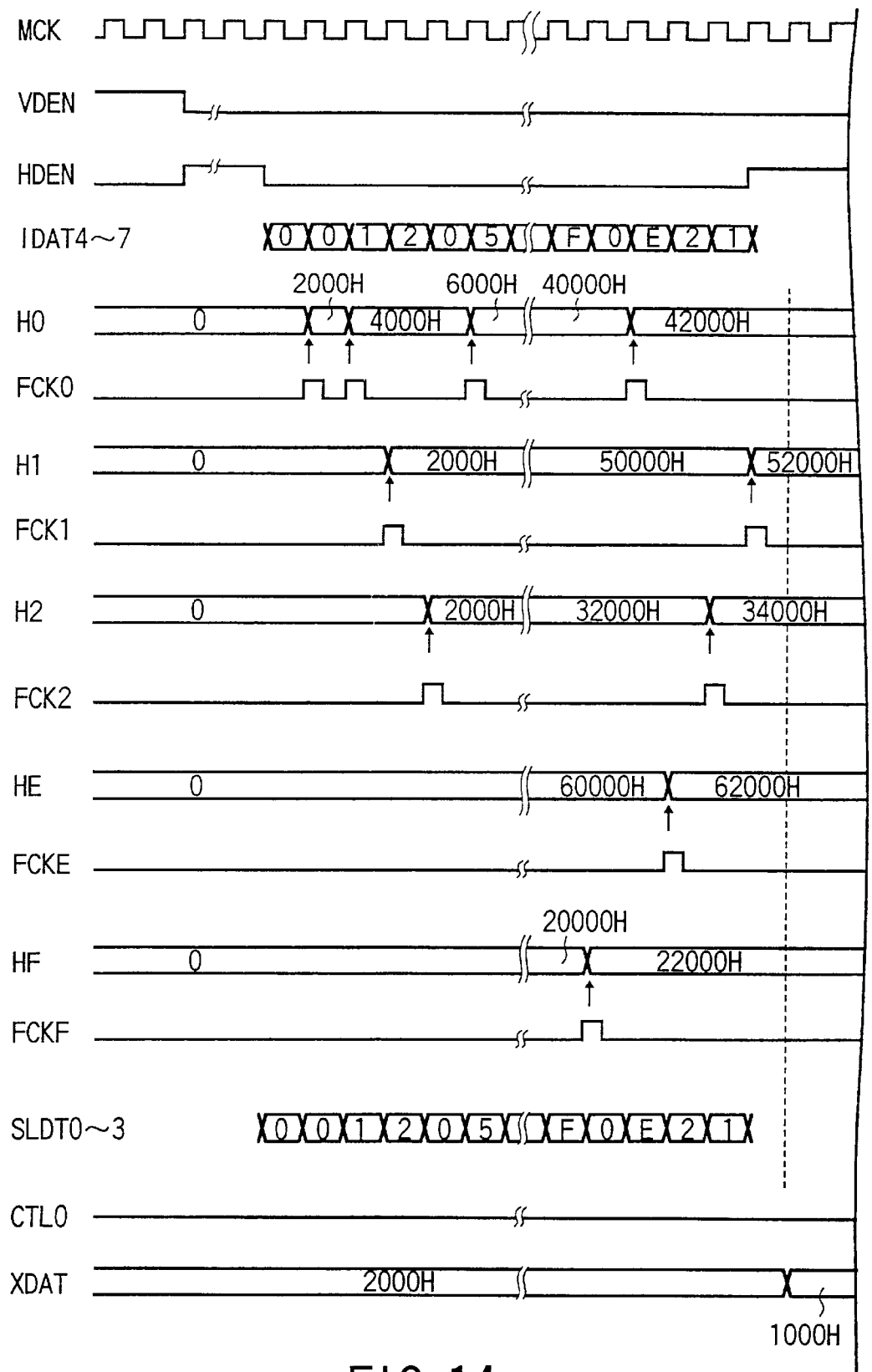
FIG. 14 is a timing chart showing the operation of the histogram producing section.

FIG. 14 is a timing chart showing a state in which "A'=(A')+αB" is calculated for each input pixel during reading of one line. The signal MCK is a main clock which synchronizes the pixel signal. The pixel density signals IDAT4 to IDAT7 supplied from the scanner section 4 are four upper bits of the pixels density and are supplied to the switch 141. Since sub-scanning enable signal CTL0 is enable (low level) in this case, the switch 141 supplies inputs IDAT4 to IDAT7 to the selector 145 and the clock generating section 143.

In accordance with the pixel signals IDAT4 to IDAT7, that is, the value of the selection input signal, the selector 145 selects outputs (the frequency) from the histogram registers $144_I$ to $144_F$ to output selected frequency signal HSDT. The signal HSDT is, in the adder section 148, added with a coefficient (XDAT) which is weighted to correspond to the number of lines. Since switch 154 is, in this case, switched to the adder section 148 in response to the input signal CTL1, the addition result signal ZDAT is returned to the histogram registers $144_I$ to $144_F$.

Then, the clock generating section 143 outputs the clock signals FCK0 to FCKF in response to the pixel signals IDAT4 to IDAT7. Each of the histogram registers $144_I$ to $144_F$ latches, that is, stores the value of the output signal WDAT from the switch 154 at the first transition of each of the clock signals FCK0 to FCKF. The above-mentioned process is performed for each of pixels for one line so that the histogram for one line is generated. Thus, a reference value for adjusting the pixel density is calculated, the reference value being used in the process for a next line.

The frequency of each density of the histogram is obtained by calculating "(A')=A−αA" in a period from reading of one line to reading of a next line, that is no pixel density signal is not being input.

Figure 15:
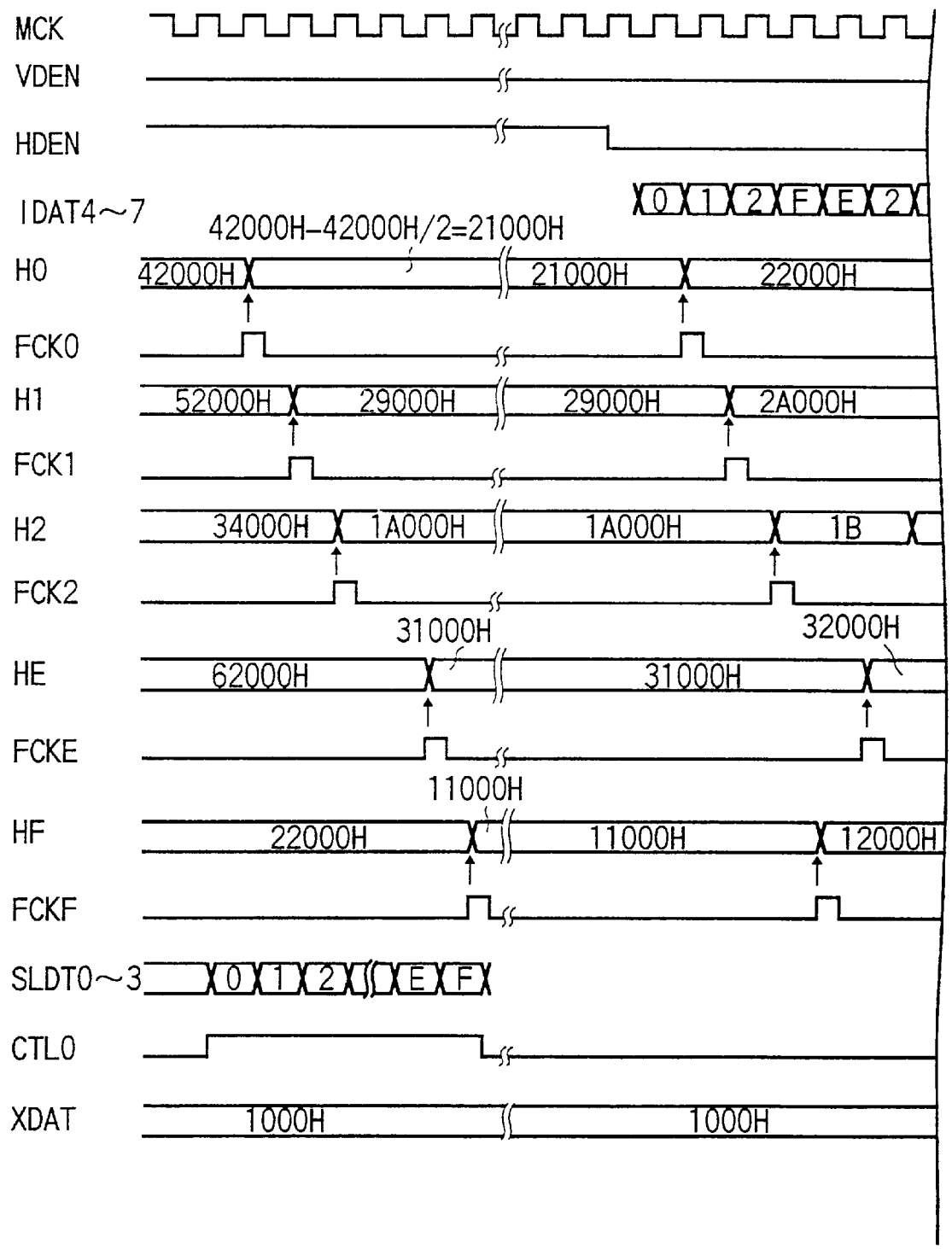
FIG. 15 is a timing chart continued from FIG. 4 and showing the operation of the histogram producing section.

FIG. 15 is a timing chart showing a state where the subtraction process is performed. The switch 141 is switched to the counter 142 in response to the selection signal CTL0, while the switch 154 is switched to the subtraction section 149 in response to the selection signal CTL1. The selector 147 subtracts the coefficient (when the mode is mode 0) or a fixed coefficient (when the mode is mode 1) determined in accordance with the count of the sub-scanning counter from each histogram value. After the subtraction process has been ended, the operation is shifted to a usual histogram producing operation. Since the above-mentioned operation is repeated, the histogram having the total quantity of data which is not changed is generated whenever each main scanning line is read.

As described above, the histogram can be obtained for each main scanning line. Thus, real time and automatic density adjustment using the histogram can be performed. Moreover, the frequency is multiplied with the weighting coefficient which is changed in accordance with the number of read lines to accumulate the frequencies so that the histogram having the total quantity of data which is not changed is generated whenever each main scanning line is read. If the weighting coefficient is made to be a fixed value, a histogram capable of corresponding to rapid change in the density of the image of the original document can be obtained.

Referring back to FIG. 3, various processes which are performed by the image processing section 96 and which are the essential portion of the present invention will now be described.

Input image data read by the scanner section 4 is temporarily received by the LB (line buffer) 201. Data of input image is also received by the LB (line buffer) 202 through the LB 201. Each pixel in a local region (3×3) represented by data of an input image is defined as shown in FIG. 17. That is, pixels are defined to be f (i−1, j−1), f (i, j−1), f (i+1, j−1), f (i−1, j), f (i, j), f (i+1, j), f (i−1, j+1), f (i, j+1) and f (i+1, j+1). The pixel f (i, j) is made to be a pixel of interest and image data subjected to the low pass filtering process which can be obtained by subjecting the pixel of interest f (i, j) to the low pass filtering process by the LPF 203 is defined to be I (i, j). I (i, j) is expressed by the following equation:

$$I(i, j) = La \times f(i, j) + Lb \times [f(i, j-1) + f(i, j+1)] + Lc \times [f(i-1, j) + f(i+1, j)] +$$

$$Ld \times [f(i-1, j-1) + f(i+1, j-1) + f(i-1, j+1) + f(i+1, j+1)] \quad (4)$$

Note that coefficients La, Lb, Lc and Ld are low pass filtering coefficients of the LPF 203 for the region 3×3 shown in FIG. 18. In order to prevent change in the local average density occurring before and after the low pass filtering process, the coefficients must satisfy the following equation:

$$La + Lb + Lc + Ld = 1 \quad (5)$$

In order to correct the contrast of the image, image data I (i, j) subjected to the low pass filtering process is subjected to the range correction process by the range correction section 207. Image data subjected to the range correction process is defined to be r (i, j).

In parallel to the low pass filtering process which is performed by the LPF 203 and the range correction process which is performed by the range correction section 207, the high pass filtering process is performed by the HPF 204. Similarly to the above-mentioned process, pixels of input image data in a local region (3×3) are defined as shown in FIG. 17. Moreover, f (i, j) is made to be a pixel of interest. Image data obtained by subjecting the pixel of interest f (i, j) to a high pass filtering process in the HPF 203 is defined to be H (i, j). H (i, j) is expressed by the following equation:

$$H(i, j) = Ha \times f(i, j) + Hb \times [f(i, j-1) + f(i, j+1)] + Hc \times [f(i-1, j) + f(i+1, j)] +$$

$$Hd \times [f(i-1, j-1) + f(i+1, j-1) + f(i-1, j+1) + f(i+1, j+1)] \quad (6)$$

Note that the coefficients Ha, Hb, Hc and Hd are high pass filtering coefficients for the HPF 204 for the region 3×3 shown in FIG. 19.

Then, data subject to the high pass filtering process is subjected to a multiplying process in the multiplier 208. The multiplying process is performed in such a manner that image data subjected to the high pass filtering process is multiplied by a weighting multiplication coefficient parameter K. In accordance with the value of the weighting multiplication coefficient parameter K, the highlighting degree of the edge can be adjusted. That is, an optimum value corresponding to the MTF characteristic and the like of the scanner section 4 can be set. In this case, the edge is further highlighted in proportion to the value of the parameter K. Note that image data which has been subjected to the multiplying process in the adder 209 is called image data subjected to the multiplying process.

Image data subjected to the range correction process and image data corresponding to image data subjected to the range correction process and subjected to the multiplying process are synthesized by the adder 209. Image data obtained by the foregoing synthesizing process is defined to be f' (i, j).

f' (i, j) is expressed by the following equation:

$$f'(i, j) = (i, j) + h(i, j) \times K \quad (7)$$

The above-mentioned high pass filtering process and the low pass filtering process can be realized by a 2-line buffer.

Although the description has been performed about the case in which the mask size is 3×3, the present invention is not limited to this. The mask size may arbitrarily be determined. Size (m×n) generally requires a line buffer for (n−1) lines. Thus, the size can be halved as compared with the conventional structure. Because the conventional structure performed the high pass filtering process after the low pass filtering process and both the high pass filtering process and the lowpass filtering process require a lines buffer for (n−1) lines. Also the values and positions of the coefficients for the LPF 203 and HPF 204 are not limited to those according to this embodiment. They may be arbitrary values and positions.

A density inversion phenomenon will now be described by using a sample of image data shown in FIG. 20 and consisting of image data 1, image data 2, image data 3 and image data 4.

Initially, attention is paid to image data 1 and image data 2 to describe the phenomenon. Image data 1a when read by the scanner is composed of a plurality of pixels having a first density level. Specifically, image data 1a is composed of a 3×3 pixel matrix, and each pixel has a density level of FAh. On the other hand, image data 2a when read by the scanner is composed of a plurality of pixels consisting of pixel having a first density level and pixels having a second density level higher than the first density level. Specifically, image data 2a is composed of a 3×3 pixel matrix, and central pixel of the pixel matrix has the density level of FAh and peripheral pixels surrounding the central pixel have a density level of FFh.

That is, it can be said that image data 2a has irregular densities. When the foregoing image data 1a and image data 2a are compared with each other, it can be said that the density of image data 2a is (substantially) higher than the density of image data 1a from a macroscopic viewpoint.

For example, the above-mentioned image data 1a is subjected to the low pass filtering process and a range correction process in which the reference value for a black image is F8h. As a result, image data 1b is obtained as image data subjected to the range correction process. Each pixel of image data 1b has a density level of FFh at this time. In parallel to the low pass filtering process and the range correction process, image data 1a is subjected to the high pass filtering process and a multiplying process in which the multiplying coefficient K=0.5. As a result, image data 1c is obtained as image data subjected to the multiplying process. At this time, each pixel of image data 1c has a density level of 00h. An assumption is performed that the high pass filtering process which is performed by the HPF 204 employs high pass filtering coefficients Ha=4, Hb=0, Hc=0 and Hd=−1. Then, a synthesizing process is performed in which image data 1b and image data 1c are synthesized. As a result, image data 1d is obtained as synthesized image data. At this time, each pixel of image data 1d has a density level of FFh.

Similarly, image data 2a is subjected to the low pass filtering process and a range correction process in which the reference value for a black image is F8h. As a result, image data 2b is obtained as image data subjected to the range correction process. At this time, each pixel of image data 2b has a density level of FFh. In parallel to the low pass filtering process and the range correction process, image data 2a is subjected to the high pass filtering process and a multiplying process in which multiplying coefficient K=0.5. As a result, image data 2c is obtained as image data subjected to the multiplying process. At this time, pixels each having a minus component appear in image data 2c. An assumption is performed high pass filtering coefficients Ha=4, Hb=0, Hc=0 and Hd=−1 are employed in the high pass filtering process which is performed by the HPF 204.

Therefore, h (i, j) which is obtained by subjecting the pixel of interest f (i, j) to the high pass filtering process is made to be h (i, j)=−1×FFh×4+4×FAh=−20=−14h. When the peripheral pixels f (i−1, j−1), f (i−1, j+1), f (i+1, j−1) and f (i+1, j+1) are subjected to the high pass filtering process, h (i−1, j−1), h (i−1, j+1), h (i+1, j−1) and h (i+1, j+1) are obtained which are h (i−1, j−1)=h (i−1, j+1)=h (i+1, j−1)=h (i+1, j+1)=−1×FFh×3−1×FAh×1+4×FFh=5. The results of the high pass filtering process to which the other peripheral pixels are subjected are zero.

As described above, the range correction process and the multiplying process are performed, and then the synthesizing process is performed to synthesize image data 2b and image data 2c. As a result, image data 2d is obtained as synthesized image data. At this time, the density level of the central pixel of image data 2d is F5h, while the density level of peripheral pixels surrounding the central pixel is FFh.

When image data 1a and image data 2a are subjected to a comparison, the density of image data 2a is, as described above, higher than the density of image data 1a in a macroscopic viewpoint. When image data 1d and image data 2d are subjected to a comparison, the density of image data 2d is lower than the density of image data 1d in a macroscopic viewpoint. That is, a fact can be understood that the densities are inverted as a result of the synthesizing process.

Then, attention is paid to image data 3 and image data 4 to describe the phenomenon. Image data 3a is, in a state when read by the scanner, composed of a plurality of pixels having a third density level. Specifically, image data 3a is composed of a 3×3 pixel matrix, and each pixel has a density level of 05h. On the other hand, image data 4a, in a state when read by the scanner, is composed of a plurality of pixels consisting of pixel having a third density level and pixels having a fourth density level lower than the third density level. Specifically, image data 4a is composed of a 3×3 pixel matrix, the central pixel of the pixel matrix has the density level of 05h and peripheral pixels surrounding the central pixel have a density level of 00h.

That is, it can be said that image data 4a has irregular densities. When the foregoing image data 3a and image data 4a are compared with each other, it can be said that the density of image data 4a is (substantially) lower than the density of image data 3a from a macroscopic viewpoint.

The above-mentioned image data 3a is subjected to the low pass filtering process and a range correction process in which the reference value for a black image is 08h. As a result, image data 3b is obtained as image data subjected to the range correction process. Each pixel of image data 3b has a density level of 00h at this time. In parallel to the low pass filtering process and the range correction process, image data 3a is subjected to the high pass filtering process and a multiplying process in which the multiplying coefficient K=0.5. As a result, image data 3c is obtained as image data subjected to the multiplying process. At this time, each pixel of image data 3c has a density level of 00h. An assumption is performed that the high pass filtering process which is performed by the HPF 204 employs high pass filtering coefficients Ha=4, Hb=0, Hc=0 and Hd=−1. Then, a synthesizing process is performed in which image data 3b and image data 3c are synthesized. As a result, image data 3d is obtained as synthesized image data. At this time, each pixel of image data 3d has a density level of 00h.

Similarly, image data 4a is subjected to the low pass filtering process and a range correction process in which the reference value for a black image is 08h. As a result, image data 4b is obtained as image data subjected to the range correction process. At this time, each pixel of image data 4b has a density level of 00h. In parallel to the low pass filtering process and the range correction process, image data 4a is subjected to the high pass filtering process and a multiplying process in which multiplying coefficient K=0.5. As a result, image data 4c is obtained as image data subjected to the multiplying process. At this time, pixels each having a minus component appear in image data 4c. An assumption is performed that high pass filtering coefficients Ha=4, Hb=0, Hc=0 and Hd=−1 are employed in the high pass filtering process which is performed by the HPF 204. Moreover, a synthesizing process for synthesizing image data 4b and image data 4c are performed. As a result, image data 4d is obtained as synthesized image data. At this time, the central pixel of image data 4d has a density level of 0Ah and peripheral pixels surrounding the central pixel has a density level of 00h.

When image data 3a and image data 4a are subjected to a comparison, the density of image data 4a is lower than the density of image data 3a in a macroscopic viewpoint as described above. However, when image data 3d and image data 4d are compared with each other, it can be said that the density of image data 4d is (substantially) higher than the density of image data 3d in a macroscopic viewpoint. That is, the densities are inverted as a result of the synthesizing process.

Accordingly, the present invention is structured such that the output selection section 210 is operated to prevent the phenomenon of inversion of the densities. That is, in a case of image data having a possibility of the density inversion phenomenon, image data subjected to the range correction process is selected and output. In a case of image data having no possibility of the density inversion phenomenon, synthesized image data is selected and output. The selection process is performed by the output selection section 210 in accordance with the threshold for the density supplied from the threshold setting section 220.

The threshold setting section 220 is provided with the lower limit setting section 220a and the upper limit setting section 220b. A lowest density threshold (D1) set to the lower limit setting section 220a, a highest density threshold (D2) set to the upper limit setting section 220b and a density value (D) of image data subjected to the range correction process are subjected to comparisons in the comparison section 210a. In accordance with a result of the comparison performed in the comparison section 210a, the output selection section 210 selects image data which must be selected. That is, either image data subjected to the range correction process or image data subjected to the synthesizing process is selected and output.

Specifically, if a result is such that D2<D or D<D1, image data subjected to the range correction process is selected. If a result is such that D1≦D≦D2, synthesized image data is selected. The highest density threshold and the lowest density threshold are determined in such a manner that the density inversion phenomenon can be prevented if image data having the density value included in the foregoing threshold is subjected to the synthesizing process. For example, density level 01h or density level 02h is set as the lowest density threshold. Density level FDh or density level FEh is set as the upper density threshold.

Figure 21:
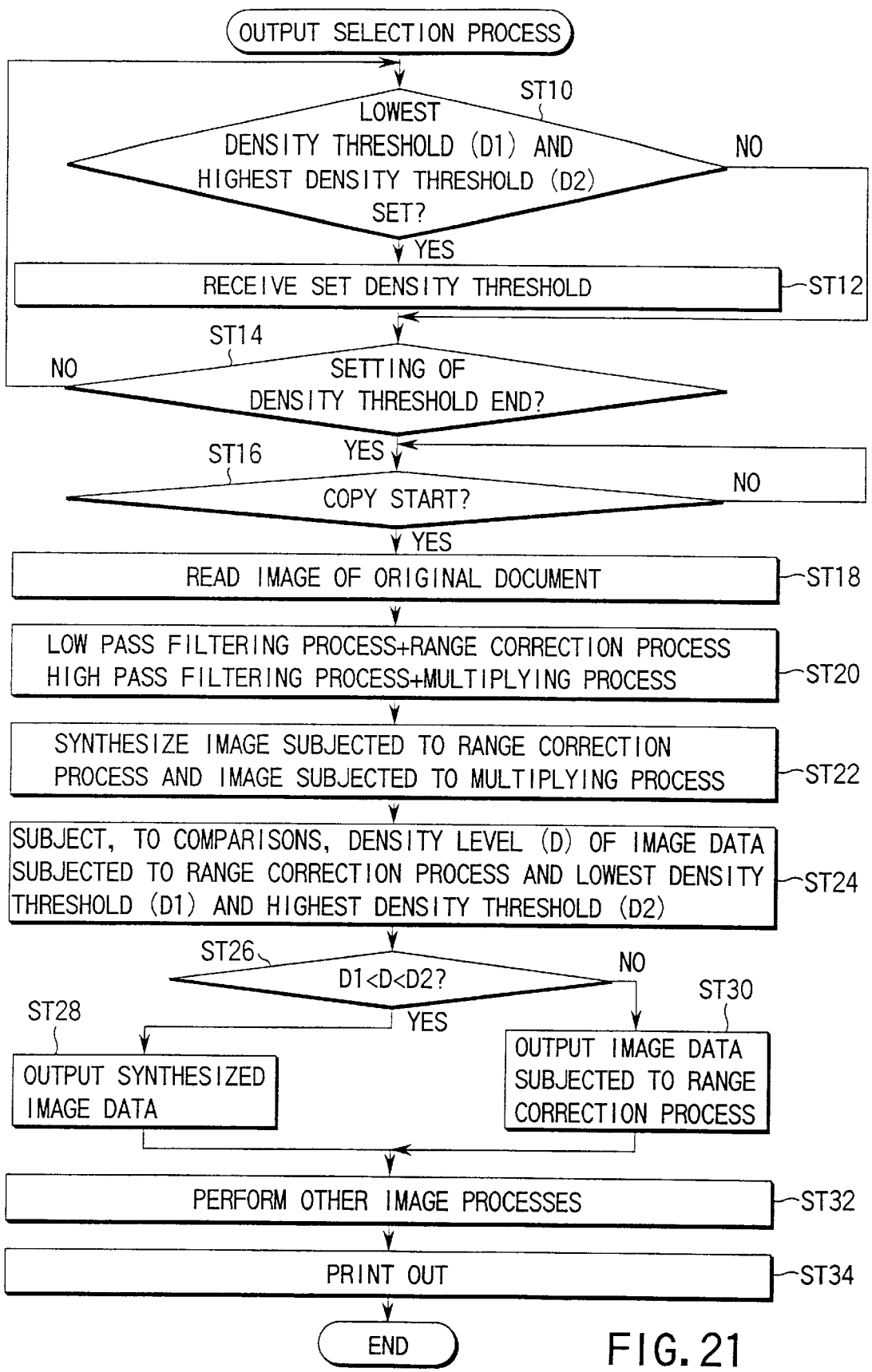
FIG. 21 is a flow chart of a selection output process in an image processing method according to the embodiment of the present invention.

Referring to a flow chart shown in FIG. 21, the output selection process which is performed by the output selection section 210 will now be described. The process which is performed in accordance with the flow chart shown in FIG. 21 is performed by the main CPU 91 shown in FIG. 2.

Initially, the lowest density threshold (D1) and the highest density threshold (D2) respectively are set to the lower limit setting section 220*a* and upper limit setting section 220*b* by operating the input section 82 of the operation panel 80 (YES in ST10) (ST12). When the printing key 81 is depressed on condition that the lowest density threshold and the highest density threshold have been set (YES in ST14), the copying operation is started (YES in ST16). When the copying operation has been started, the image of the original document placed on the original-document retainer 12 is read by the scanner section 4 (ST18).

Input image data read and acquired by the scanner section 4 is subjected to the low pass filtering process by the LPF 203. Image data subjected to the low pass filtering process which has been subjected to the above-mentioned low pass filtering process is subjected to the range correction process by the range correction section 207 (ST20). In parallel to the low pass filtering process and the range correction process, input image data is subjected to the high pass filtering process by the HPF 204. Image data subjected to the high pass filtering process which has been subjected to the above-mentioned high pass filtering process is subjected to the multiplying process by the multiplier 208 (ST20). Then, image data subjected to the range correction process and image data subjected to the multiplying process are synthesized by the adder 209 (ST22).

Then, the density level (D) of image data subjected to the range correction process, the lowest density threshold (D1) and the highest density threshold (D2) are subjected to comparisons in the comparison section 210*a* (ST24). If results of the comparison are D1≦D≦D2 (YES in ST26), synthesized image data obtained by synthesizing image data subjected to the range correction process and image data subjected to the multiplying process is selected and output (ST28). If results of the comparisons are D2<D or D<D1 (NO in ST26), image data subjected to the range correction process is selected and output (ST30). Note that the process for selecting and outputting synthesized image data or image data subjected to the range correction process in accordance with the results of the comparisons is performed by the switching circuit 210*b* of the output selection section 210.

Then, image data selected and output by the output selection section 210 is subjected to a next image process (ST32), and then printed out by the printer section 6 (ST34).

Although the description of this embodiment has been performed about the structure in which the low pass filtering process and the high pass filtering process are performed in parallel, the present invention is not limited to this. That is, the order of the low pass filtering process and the high pass filtering process may be determined arbitrarily.

According to the present invention, the output selection section 210 selects and outputs image data subjected to the range correction process if image data has the possibility of the density inversion phenomenon. In the case of image data having no possibility of the density inversion phenomenon, synthesized image data is selected and output. Thus, an image processing apparatus, an image processing method and an image forming apparatus having the following advantages can be provided.

An image processing apparatus and an image processing method can be provided which have a hardware structure in which the range correction process is performed after the low pass filtering process has been performed and the weighting process is performed after the high pass filtering process has been performed and which are capable of preventing the density inversion phenomenon occurring attributable to synthesis of image data subjected to the range correction process and image data subjected to the weighting process. Moreover, an image forming apparatus using the image processing apparatus can be provided.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus for processing original image data, having a given density range, with a predetermined manner to provide processed image data, comprising:
    means for correcting the density range of the image data to provide density-range-corrected image data corresponding to a distribution of the density of the image data;
    means for filtering the image data to generate filtered image data;
    means for synthesizing the density-range-corrected image data provided by said correcting means and the filtered image data provided by said filtering means so as to provide synthesized image data; and
    means for selecting either one of the density-range-corrected image data provided by said correcting means and the synthesized image data provided by said synthesizing means, in accordance with the density range of the density-range-corrected image data, so as to provide selected image data as said processed image data.

2. An image processing apparatus according to claim 1, wherein said filtering means includes
    first filtering means for filtering the image data to generate first filtered image data, and
    second filtering means for filtering the image data to generate second filtered image data;
    wherein said correcting means includes means for changing the density range of the first filtered image data to provide said density-range-corrected image data corresponding to a distribution of the density of the image data; and
    wherein said synthesizing means includes means for combining the density-range-corrected image data provided by said changing means with data corresponding to the second filtered image data provided by said second filtering means.

3. An image processing apparatus according to claim 2, wherein
    said first filtering means includes means for extracting a predetermined spatial frequency component from image data, so as to provide said first filtered image data.

4. An image processing apparatus according to claim 2, wherein
    said second filtering means includes means for extracting a predetermined spatial frequency component from image data, so as to provide said second filtered image data.

5. An image processing apparatus according to claim 2, wherein
    said first filtering means includes means for extracting a first spatial frequency component from image data in order to prevent moire, so as to provide said first filtered image data, and said second filtering means includes means for extracting a second spatial frequency component higher than the first spatial frequency component from image data in order to highlight edges, so as to provide said second image data.

6. An image processing apparatus according to claim 2, further comprising means for multiplying the second filtered image data provided by said second filtering means with a predetermined coefficient so as to provide multiplied image data, wherein said synthesizing means includes means for combining the density-range-corrected image data provided by said correcting means with the multiplied image data provided by said multiplying means and corresponding to the density-range-corrected image data.

7. An image processing apparatus according to claim 1, wherein said selecting means includes means for comparing the density level of the density-range-corrected image data provided by said correcting means with a predetermined density threshold, so as to provide a result of a comparison.

8. An image processing apparatus according to claim 7, further comprising means for setting an arbitrary density threshold between a lowest density level and a highest density level which are subjects of the density levels, so as to provide a set arbitrary density threshold.

9. An image processing apparatus according to claim 7, wherein said selecting means includes sub selecting means for selecting either one of the density-range-corrected image data provided by said correcting means and the synthesized image data provided by said synthesizing means and corresponding to the density-range-corrected image data, in accordance with the result of the comparison provided by said comparing means, so as to provide selected image date as said processed image data.

10. An image processing apparatus according to claim 7, wherein said selecting means includes sub selecting means for selecting the density-range-corrected image data provided by said correcting means so as to provide selected image data, when the density level of the density-range-corrected image data is lower than the predetermined density threshold, and for selecting the synthesized image data provided by said synthesizing means so as to provide selected image data, when the density level of the density-range-corrected image data is equal or higher than the predetermined density threshold.

11. An image processing apparatus according to claim 7, wherein said selecting means includes sub selecting means for selecting the density-range-corrected image data provided by said correcting means so as to provide selected image data, when the density level of the density-range-corrected image data is higher than the predetermined density threshold, and for selecting the synthesized image data provided by said synthesizing means so as to provide selected image data, when the density level of the density-range-corrected image data is equal or lower than the predetermined density threshold.

12. An image processing apparatus according to claim 1, wherein said selecting means includes comparing means for comparing the density level of the density-range-corrected image data provided by said correcting means with a first density threshold and a second density threshold, the density level of which is higher than that of the first density threshold, so as to provide a result of a comparison.

13. An image processing apparatus according to claim 12, further comprising means for setting first and second density thresholds between a lowest density level and a highest density level which are subjects of density levels, so as to provide sat first and second arbitrary density thresholds.

14. An image processing apparatus according to claim 12, further comprising means for setting a second density level as the first density threshold when a region from a lowest density level to a highest density level which are the subjects of density levels is uniformly divided into 256 steps, the lowest density level is made to be the first density level and the highest density level is made to be a 256-th density level.

15. An image processing apparatus according to claim 12, further comprising means for setting a third density level as the first density threshold when a region from a lowest density level to a highest density level which are the subjects of density levels is uniformly divided into 256 steps, the lowest density level is made to be a first density level and the highest density level is made to be a 256-th density level.

16. An image processing apparatus according to claim 12, further comprising means for setting a 254-th density level as the second density threshold when a region from a lowest density level to a highest density level which are the subjects of density levels is uniformly divided into 256 steps, the lowest density level is made to be a first density level and the highest density level is made to be a 256-th density level.

17. An image processing apparatus according to claim 12, further comprising means for setting a 255-th density level as the second density threshold when a region from a lowest density level to a highest density level which are the subjects of density levels is uniformly divided into 256 steps, the lowest density level is made to be a first density level and the highest density level is made to be a 256-th density level.

18. An image processing apparatus according to claim 12, wherein said selecting means includes sub selecting means for selecting either one of the density-range-corrected image data provided by said correcting means and the synthesized image data provided by said synthesizing means and corresponding to the density-range-corrected image data, in accordance with the result of the comparison provided by said comparing means, so as to provide selected image data as said processed image data.

19. An image processing apparatus according to claim 12, wherein said selecting means includes sub selecting means for selecting the density-range-corrected image data provided by said correcting means so as to provide selected image data, in a case where the density level of the density-range-corrected image data is lower than the first density threshold or higher than the second density threshold, and for selecting the synthesized image data provided by said synthesizing means so as to provide selected image data, in a case where the density level of the density-range-corrected image data is equal or higher than the first density threshold and equal or lower than the second density threshold.

20. An image processing apparatus for processing original image data, having a given density range, with a predetermined manner to provide processed image data, comprising:

wherein said original image data includes first image data having pixels each provided with a first density level and second image data having other pixels each provided with the first density level and a second density level which is higher than the first density level, means for correcting the density range of the first image data to provide density-range-corrected first image data corresponding to a distribution of the density of the first image data, and for correcting the density range of the second image data to provide density-range-corrected second image data corresponding to a distribution of the density of the second image data;

means for filtering the first image data to generate filtered first image data, and for filtering the second image data to generate filtered second image data;

means for synthesizing the density-range-corrected first image data provided by said correcting means and the filtered first image data provided by said filtering means so as to provide synthesized first image data, and for synthesizing the density-range-corrected second image data provided by said correcting means and the filtered second image data provided by said filtering means so as to provide synthesized second image data; and means for selecting either one of the density-range-corrected first image data provided by said correcting means and the synthesized first image data provided by said synthesizing means, in accordance with the density range of the density-range-corrected first image data, so as to provide selected first image data as said processed image data, and for selecting either one of the density-range-corrected second image data provided by said correcting means and the synthesized second image data provided by said synthesizing means, in accordance with the density range of the density-range-corrected second image data, so as to provide selected second image data as said processed image data, wherein there are a first density level relation between the first synthesized image data and the second synthesized image data and a second density level relation between the first image data and the second image data, and wherein said selecting means selects either one of the density-range-corrected first image data and the synthesized first image data, and selects either one of the density-range-corrected second image data and the synthesized second image data, in order to prevent substantial inversion of said first density level relation with respect to said second density level relation.

21. An image forming apparatus comprising:

means for reading an image and converting read image into a digital signal to provide the digital signal as image data;

means for correcting the density range of the image data to provide density-range-corrected image data corresponding to a distribution of the density of the image data;

means for filtering the image data to generate filtered image data;

means for synthesizing the density-range-corrected image data provided by said correcting means and the filtered image data provided by said filtering means so as to provide synthesized image data;

means for selecting either one of the density-range-corrected image data provided by said correcting means and the synthesized image data provided by said synthesizing means, in accordance with the density range of the density-range-corrected image data, so as to provide selected image data; and means for forming an image in accordance with selected image data to output formed image.

22. An image processing method comprising the step of:

first step for correcting the density range of the image data to provide density-range-corrected image data corresponding to a distribution of the density of the image data;

second step for filtering the image data to generate filtered image data;

third step for synthesizing the density-range-corrected image data provided by said first step and the filtered image data provided by said second step so as to provide synthesized image data; and fourth step for selecting either one of the density-range-corrected image data provided by said first step and the synthesized image data provided by said third step, in accordance with the density range of the density-range-corrected image data, so as to provide selected image data.

* * * * *